US005990843A

United States Patent [19]

Knapp

[11] Patent Number: 5,990,843

[45] Date of Patent: Nov. 23, 1999

[54] HIGHLY-STIFFENED, DUAL-AXLE ANTENNA TRACKING PEDESTAL

[76] Inventor: Ronald H. Knapp, 98-030 Hekaha St., Suite 20, Aiea, Hi. 96701

[21] Appl. No.: 08/912,255

[22] Filed: Aug. 15, 1997

Related U.S. Application Data

[60] Provisional application No. 60/023,974, Aug. 15, 1996.

[51] Int. Cl.[6] .............................. H01Q 1/18; H01Q 3/03; G02B 5/10

[52] U.S. Cl. .......................... 343/765; 343/766; 343/709; 248/396; 248/183

[58] Field of Search .................................... 343/765, 757, 343/758, 763, 881, 882, DIG. 2; 248/123.2, 346.3

[56] References Cited

U.S. PATENT DOCUMENTS

| | | | |
|---|---|---|---|
| 3,233,475 | 2/1966 | Barber | 343/765 |
| 4,225,868 | 9/1980 | Mazur | 343/765 |
| 4,433,337 | 2/1984 | Smith et al. | 343/765 |
| 4,491,388 | 1/1985 | Wood | 350/636 |

*Primary Examiner*—Don Wong
*Assistant Examiner*—James Clinger
*Attorney, Agent, or Firm*—James Creighton Wray; Meera P. Narasimhan

[57] ABSTRACT

The highly-stiffened, dual-axle antenna tracking pedestal improves tracking performance, reduces manufacturing and installation costs and increases safety during field assembly, maintenance and operation of the pedestal. The reinforced concrete counterweights affect the natural frequency of the pedestal system and reduce vibrational effects from wind loads during antenna slew. Reduction of the number of structural components and pouring concrete counterweights at the job site simplifies fabrication, as well as reducing shipping and handling costs. The use of a dual-axle mount provides antenna slewing without problems associated with conventional azimuth-elevation pedestal systems. The pedestal mount has a structure and drive system that is simple and inexpensive. The drive system has two orthogonal rotational axes, one oriented east-west and the other north-south. The two rotational degree-of-freedom arrangement allows smooth tracking over the entire sky.

29 Claims, 36 Drawing Sheets

HIGHLY-STIFFENED, DUAL-AXLE ANTENNA TRACKING PEDESTAL

BACKGROUND OF THE INVENTION

This application claims the benefit of U.S. Provisional Application No. 60/023,974 filed Aug. 15, 1996.

The explosion of use of communication satellites has created a need for a satellite tracking station that is rugged and reliable and that can be assembled inexpensively and quickly. The station also must be able to operate accurately in winds up to 40 mph and survive hurricane-force winds, yet light enough to be shipped economically anywhere in the world.

SUMMARY OF THE INVENTION

The new highly-stiffened, dual-axle antenna tracking pedestal provides features that improve tracking performance, reduce manufacturing and installation costs and increase safety during field assembly, maintenance and operation of the pedestal.

A primary new embodiment of this invention is the implementation of reinforced concrete counterweights that also serve to greatly stiffen the pedestal structure. This is desirable to increase the natural frequency of the pedestal system and thereby reduce vibrational effects from wind loads during antenna slew. Instead of relying only on structural shapes and plate to provide needed structural stiffness, steel reinforcing bars are attached between vertical side plates and concrete is cast in-situ between the plates. This composite structure provides a much stiffer structure than might be achieved using only metal structural shapes. This design also reduces fabrication and shipping costs. By reducing the number of structural components and pouring concrete counterweights at the job site, fabrication is simplified. Also, shipping and handling costs are reduced since only the relatively lighter structural steel units need to be shipped. A further feature includes a mold for the cast concrete as an integral part of the shipping crates.

Safety in operating and maintaining this invention is increased by use of the structurally integrated counterweights. Added concrete mass simultaneously increases structural stiffness and provides a restoring moment to upright the antenna. For a given design wind load, sufficient concrete mass can be provided to upright the antenna toward the vertical position in the event any drive train component would fail. This action is desirable to avoid personal injury and damage to the antenna during field assembly, maintenance and operation of the pedestal. Adjustment to the total counterweight mass can be made by the addition or removal of trim weights.

The use of a dual-axle mount provides antenna slewing without the so-called "key-hole" problem associated with conventional azimuth-elevation pedestal systems. The key-hole problem occurs when the antenna is pointed in a nearly vertical direction while rotating around the vertical axis. The azimuth-elevation pedestal may not slew uniformly through this position. The pedestal mount of the present invention has a structure and drive system that is simple and inexpensive. The novel drive system has two orthogonal rotational axes, one oriented east-west and the other north-south. This two rotational degree-of-freedom arrangement allows smooth tracking over most of the sky.

The tracking pedestal can be mounted on any foundation suitable to the site where it will be operated. Reinforced concrete and/or structural steel foundations are examples.

The design of the foundation should be such that it does not lower the natural vibration frequencies below that of the tracking pedestal components.

During initial assembly and in high wind load conditions, tie-down cables are attached between the pedestal counterweights and foundation anchor bolts.

The tracking pedestal for a dual-axle antenna can utilize conventional structural materials for the foundation, such as reinforced concrete or steel. A reinforced concrete block is connected to the foundation. In an alternate embodiment, the structural steel tubular pedestal base is made of welded curved and flat steel plates and angular stiffeners. Lower shaft support arms extend upward from the block with pillow block bearings mounted on the support arms. A lower shaft is mounted in the pillow blocks. A lower shaft drive gear is connected to the lower shaft. A lower drive motor is connected to the lower drive gear for rotating the lower drive gear and the lower shaft. Also connected to the lower shaft is a lower box for rotating with the lower shaft. A lower counterweight is connected to the lower box. Upper side frames are connected to the lower box. Upper shaft supports are connected to the side frames. An upper shaft is connected to the upper shaft supports. An upper gear is connected to the upper shaft. An upper drive motor is connected to the upper gear for turning the upper gear and the upper shaft. An upper box is connected to the upper shaft. An upper counterweight is connected to the upper box. A top space frame has legs which are connected to the upper box and to the top space frame for supporting the top space frame on the upper box. Antenna mounts are mounted on the top space frame.

A lower motor mount is connected to the block and connected to the lower drive motor.

The lower drive motor has a lower pinion gear which is comprised of a lower bull gear with teeth interengaging the lower pinion gear.

The lower gear is attached laterally to the lower box for moving the lower box and turning the lower gear.

The lower box has lower side plates to which the lower counterweight, comprised of a reinforced concrete counterweight, is connected.

The reinforced foundation base, reinforced block and lower shaft support arms comprise an integral reinforced base.

Containers and preassembled reinforcement bars are shipped with parts and subassemblies to erection sites in the containers containing the reinforcement bars wherein the containers are forms for pouring concrete at the site.

The lower box counterweight and upper box counterweight are reinforced concrete counterweights with reinforcement bars preassembled and shipped in containers which act as forms for pouring the concrete counterweight on site.

The top space frame provides a structural connection between the upper box and the dish antenna.

The upper gear is laterally joined to the upper box and the upper shaft. The upper box and upper gear are joined together. The side frames are angular trusses, wherein the legs are joined in angled pairs having lower ends joined together and to the upper box. The upper ends are spaced apart and joined to the circular top space frame.

The dual-axle antenna tracking pedestal kit has preassembled foundation reinforcement bars packaged in a first shipping container construction form. Preassembled lower and upper side plates and counterweight reinforcement bars are packaged in the second and third shipping container construction forms for forming lower and upper counterweighted boxes. Lower and upper bull gears are attached to lower and upper side plates, respectively. Lower and upper drive motors with drive pinions are connected to the bull gears. Lower shaft pillow blocks are mounted on a reinforced concrete foundation. A lower shaft is mounted in the pillow blocks and attached to the lower box and lower bull gear. First and second side frame trusses are connected to the lower box. First and second upper shaft bearings are connected to the side frame trusses. An upper shaft is mounted in the bearings and connected to the upper box and upper bull gear. A top space frame has triangular leg assemblies connected to the upper box antenna mounts which are connected to the top space frame.

To reduce the mass of the concrete counterweights, lead weights are positioned on the lower or upper counterweight reinforcement bars before pouring in concrete.

Auxiliary trim weights are attached to the lower counterweight.

The first and second side frame trusses have outer ends and inner ends which have bearing plates for mounting the upper shaft bearings. Lateral extensions for connecting to tops of the lower counterweight sloped braces are connected to the outer ends for connecting to sides of the lower counterweight. Three dimensional tube trusses are connected to the bearing plates remote from the lateral extensions.

The side frame trusses are tubular trusses. The extension braces and tube trusses comprise tubes welded at ends thereof.

The top space frame comprises a circular tube with antenna mounts and v-shaped tubular legs with spaced upper ends welded to the circular tube and lower ends and leg mounting plates welded to the lower ends for mounting the lower ends of the v-shaped legs on the upper box.

These and further and other objects and features of the invention are apparent in the disclosure, which includes the above and ongoing written specification, with the claims and the drawings.

DETAILED DESCRIPTION OF THE PREFERRED EMBODIMENTS

Figure 1A:
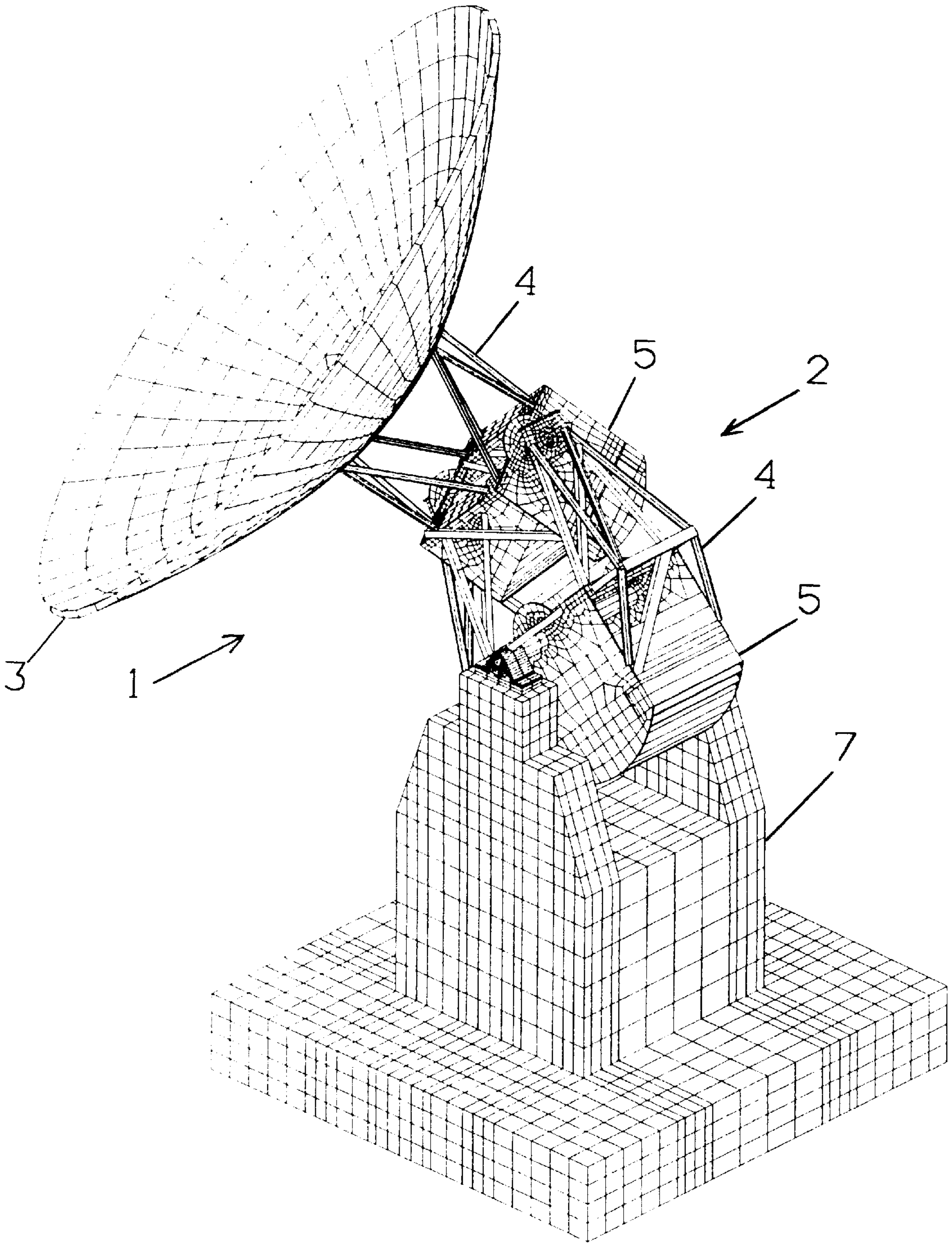
FIGS. 1A and 1B are perspective elevational views of the satellite dish, supporting framework and pedestal base.
Figure 1B:
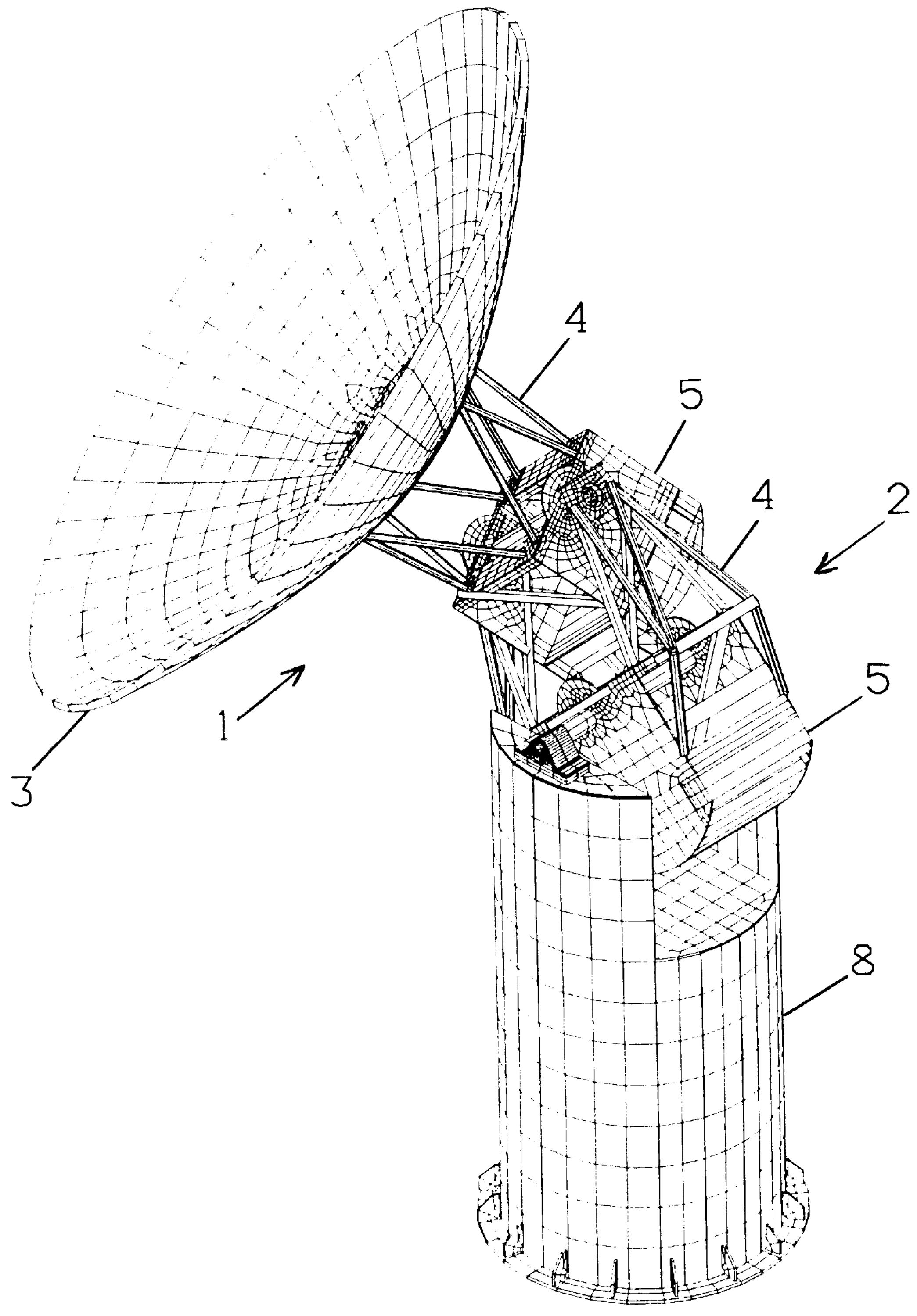
Figure 2:
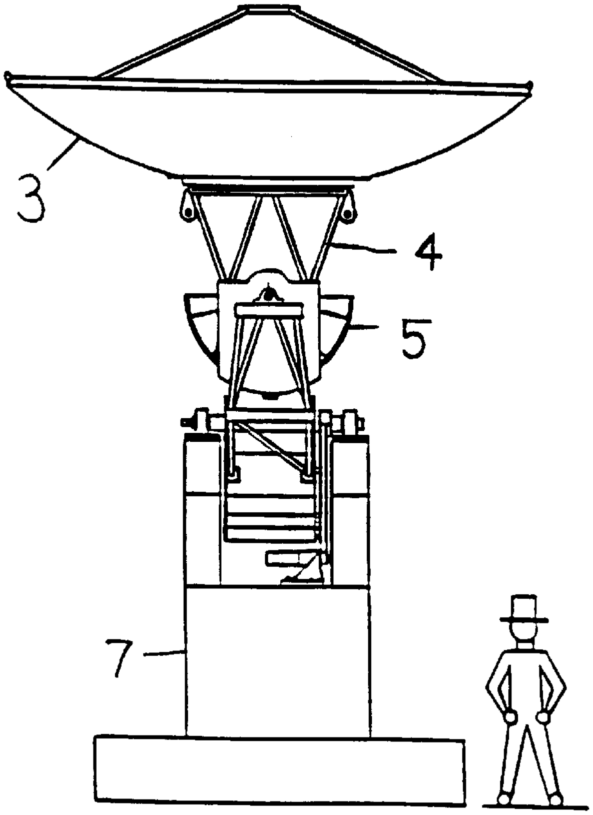
FIG. 2 is a front elevation of an early embodiment of the satellite dish, supporting framework and pedestal base shown in FIG. 1A.
Figure 3:
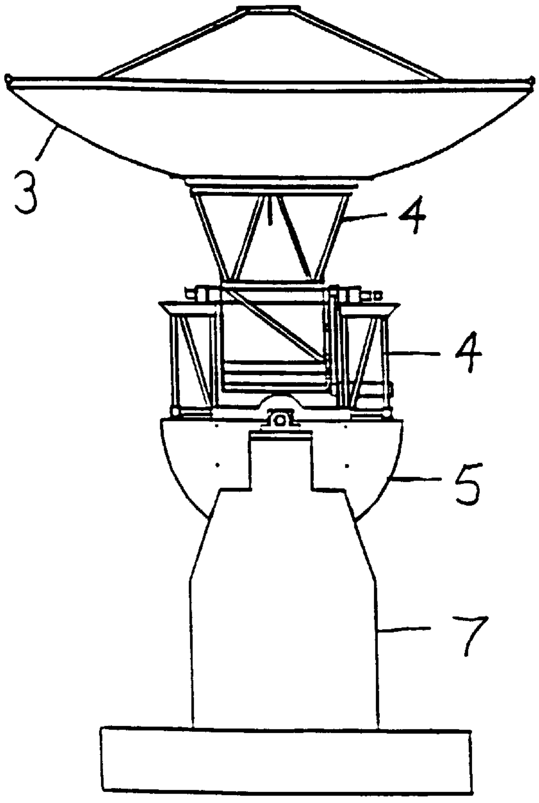
FIG. 3 is a side elevation of an early embodiment of the satellite dish, supporting framework and pedestal base shown in FIG. 2.
Figure 4:
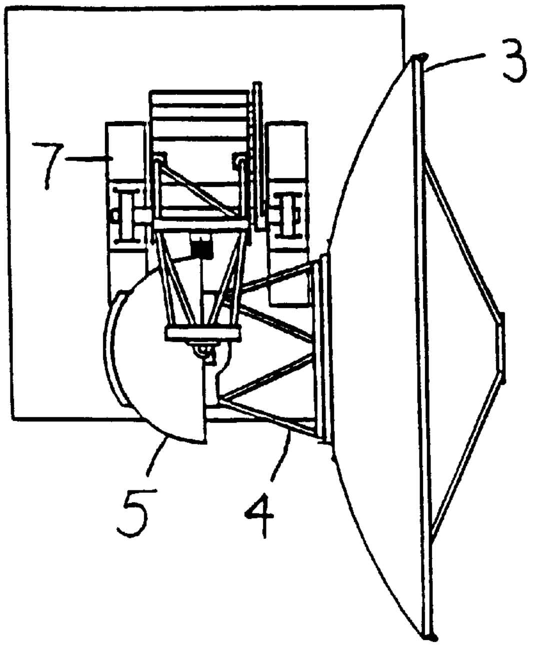
FIG. 4 is a plan view of an early embodiment of the satellite dish, supporting framework and pedestal base shown in FIGS. 2 and 3.
Figure 5:
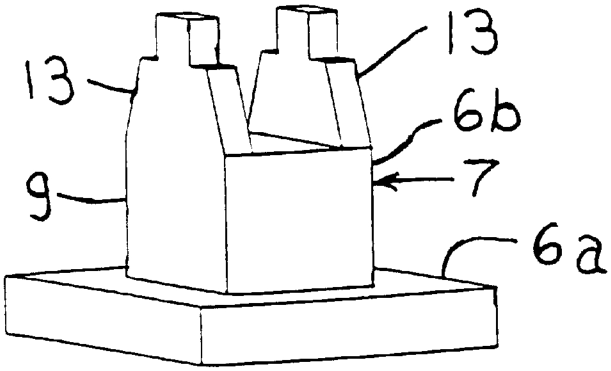
FIG. 5 is a perspective view of the pedestal base.

FIGS. 1A and 1B are perspective views of tracking antenna pedestals with distinct pedestal foundation bases. FIGS. 2,3 and 4 are front and side elevations and a plan view of an early embodiment of the satellite dish and tracking pedestal shown in FIG. 1A. Referring to the drawings, the satellite dish and tracking pedestal 1 includes tracking pedestals 2, the antenna dish 3, supporting frameworks 4, driven counterweights 5 and alternative pedestal bases 7 and 8.

FIGS. 5, 6A, 7A and 8A are a perspective view, elevations and a plan view of the concrete pedestal base 7, showing the concrete structure 9 and precut reinforcement bars 11. The main supporting columns 13 of the base 7 are aligned, for example, in the east-west direction.

Figure 6A:
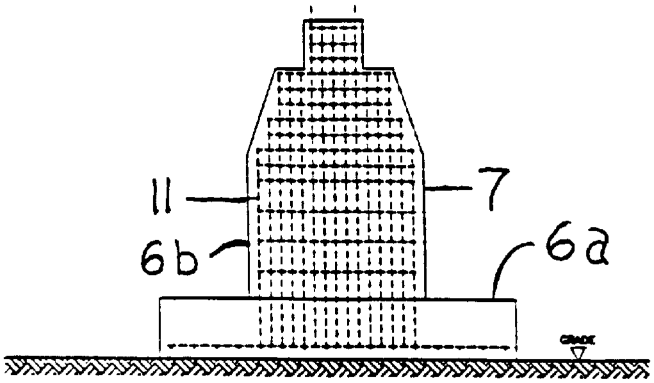
FIGS. 6A, 7A and 8A are side and front elevations and a plan view of the pedestal base shown in FIGS. 1A and 2–5.
Figure 7A:
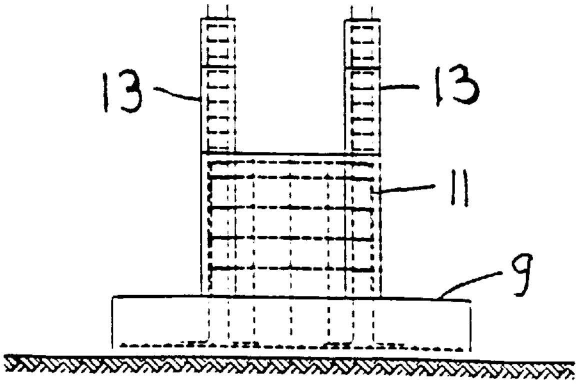
Figure 8A:
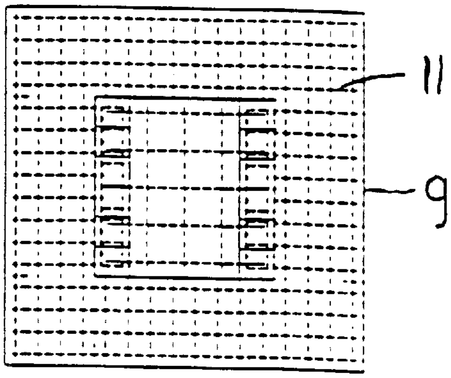
Figure 6B:
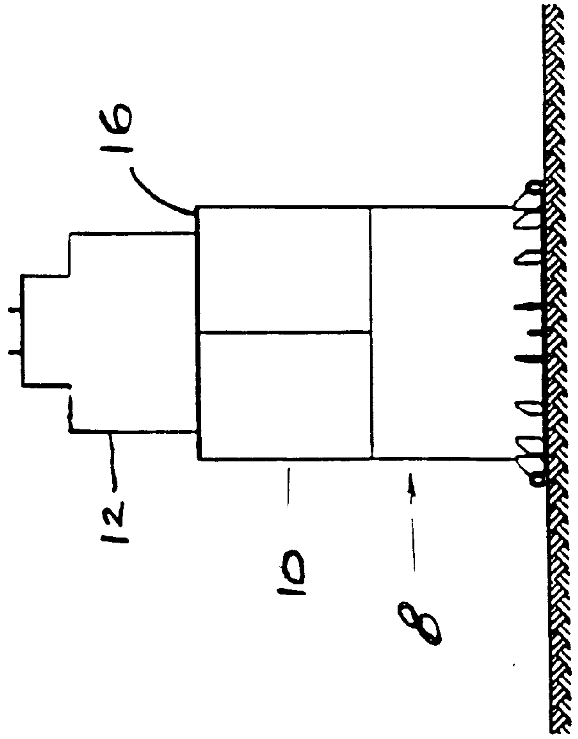
FIGS. 6B, 7B and 8B are side and front elevations and a plan view of the pedestal base shown in FIG. 1B.
Figure 7B:
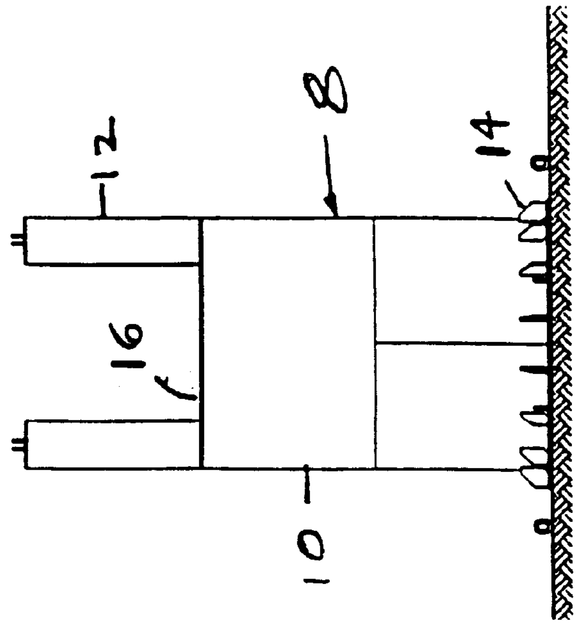
Figure 8B:
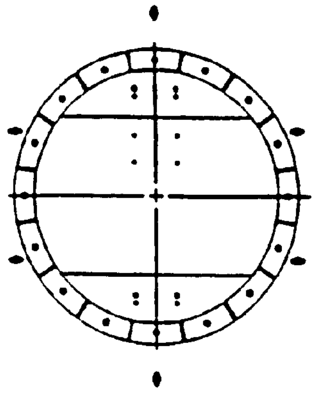

FIGS. 6B, 7B and 8B are elevations and a plan view of the structural steel tubular pedestal base 8 made of welded curved and flat steel plates 10 and angular stiffeners 14. Supports 12 extend upward beyond the cylindrical block base 16. As shown in FIG. 4, notches are needed in supports 12 for clearance of upper assembly. In an alternative embodiment, the supports may be sloped as shown in FIG. 6A.

Figure 9:
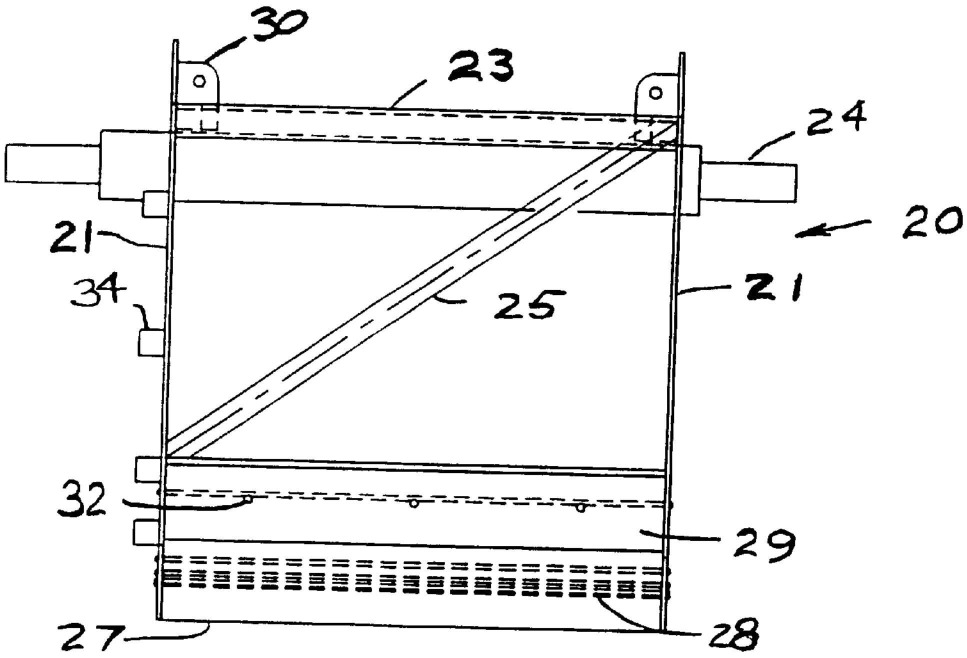
FIG. 9 is a side elevation of the upper box assembly.
Figure 10:
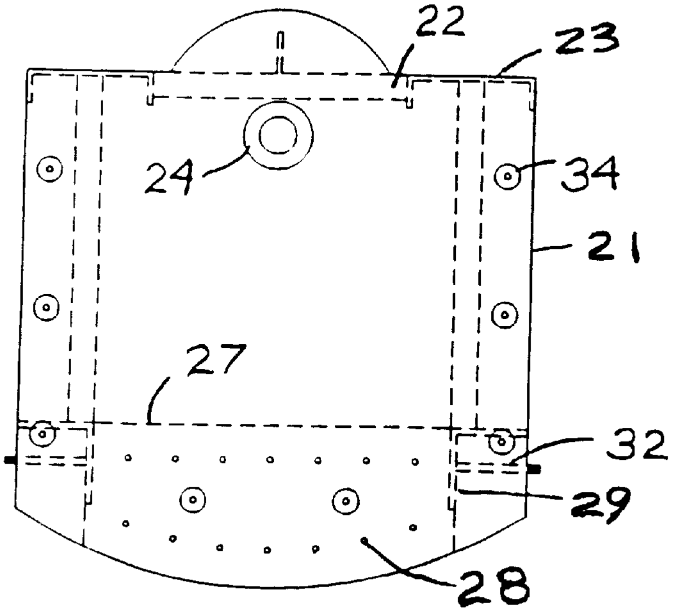
FIG. 10 is a front elevation of the upper box assembly.
Figure 11:
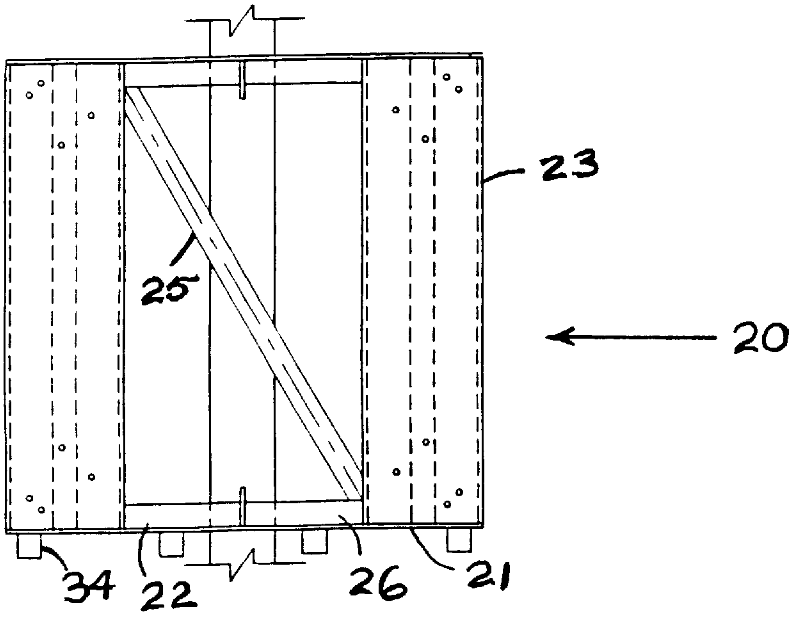
FIG. 11 is a plan view of the upper box assembly.

FIGS. 9, 10 and 11 are elevations and a plan view of the upper box assembly 20 showing the upper box side plates 21, the upper box side rails 25, the upper inverted channels 23, the upper shaft 24, the reinforcements 22, the upper box concrete counterweight 27, and the reinforcing bars 28 which are joined to the side plates 21. The upper box lifting lugs 30 are used during assembly. Ends of the lower angles 29 are welded to the side plates. Threaded rods 32 extend to receive trim weights. Threaded lugs 34 are welded to side plates 21 to receive bolts which mount the upper bull gear.

Figure 12:
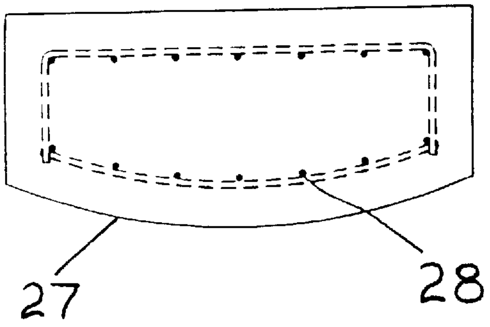
FIG. 12 is a front elevation of the upper counterweight.
Figure 13:
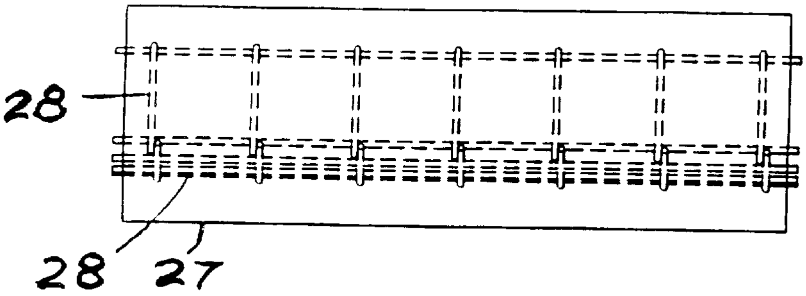
FIG. 13 is a side elevation of the upper counterweight.

FIGS. 12 and 13 are details of the concrete counterweight 27 and reinforcing bars 28 shown in FIGS. 9 and 10. The preassembled reinforcements are shipped in container forms for on site pouring. Ends of rods 28 extend through and are prewelded to the side plates 21.

Figure 14:
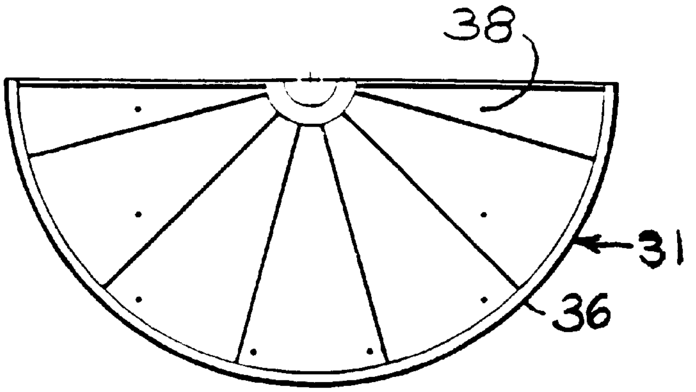
FIG. 14 is an outer side elevation of the upper box bull gear.
Figure 15:
FIG. 15 is a plan view of the upper box bull gear.
Figure 16:
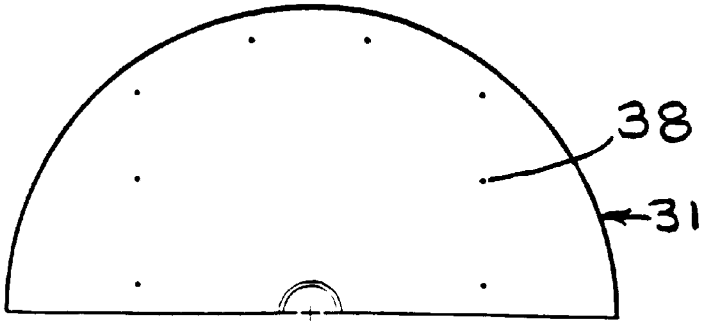
FIG. 16 is an inverted, inner side elevation of the upper box bull gear.

FIGS. 14, 15 and 16 are a side elevation, a plan view and an inverted opposite side elevation of the upper bull gear 31, which is a spur gear. Teeth 36 in the outer circumference engage teeth of driving pinion. Stiffened plate 38 receives mounting bolts for connection to lugs 34 on the side plates 21.

Figure 17:
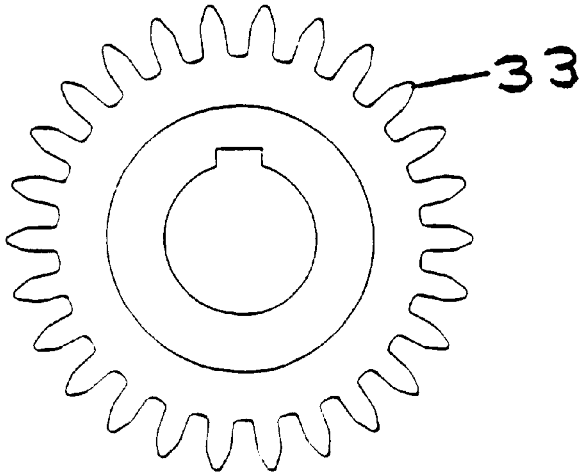
FIG. 17 is an end elevation of one of the pinion gears for driving the upper and lower bull gears.
Figure 18:
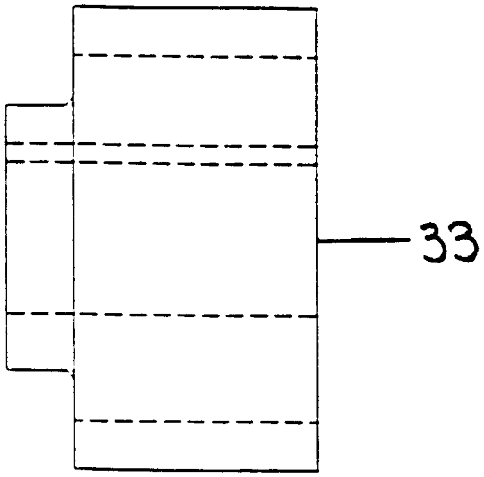
FIG. 18 is a side elevation view of the pinion gear shown in FIG. 17.

FIGS. 17 and 18 are end and side elevations of one of two pinion gears 33 for driving the upper and lower bull gears.

Figure 19:
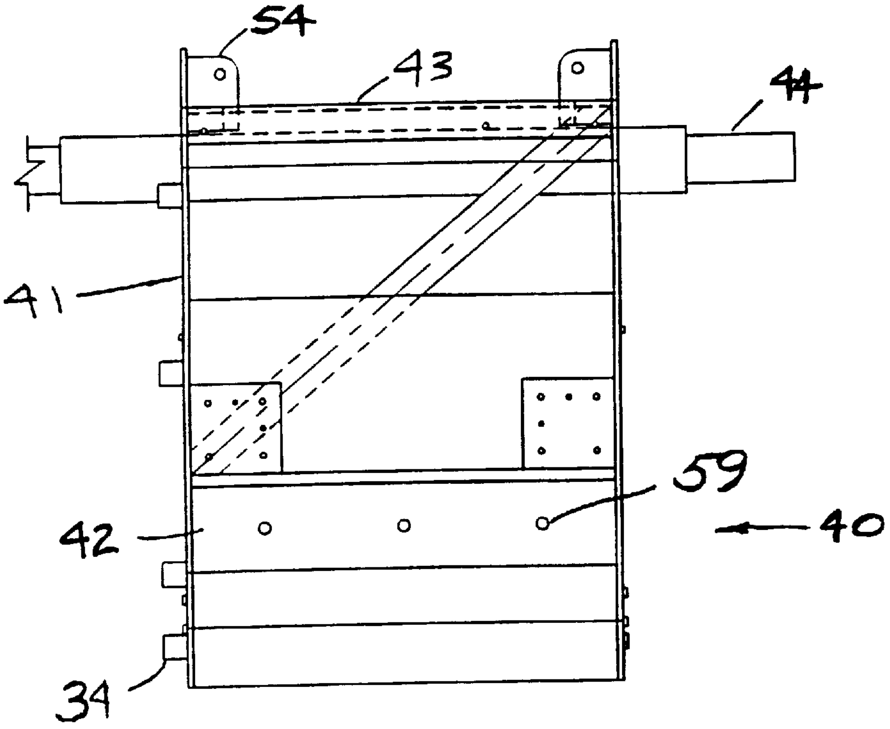
FIG. 19 is a front elevation of the lower box assembly.
Figure 20:
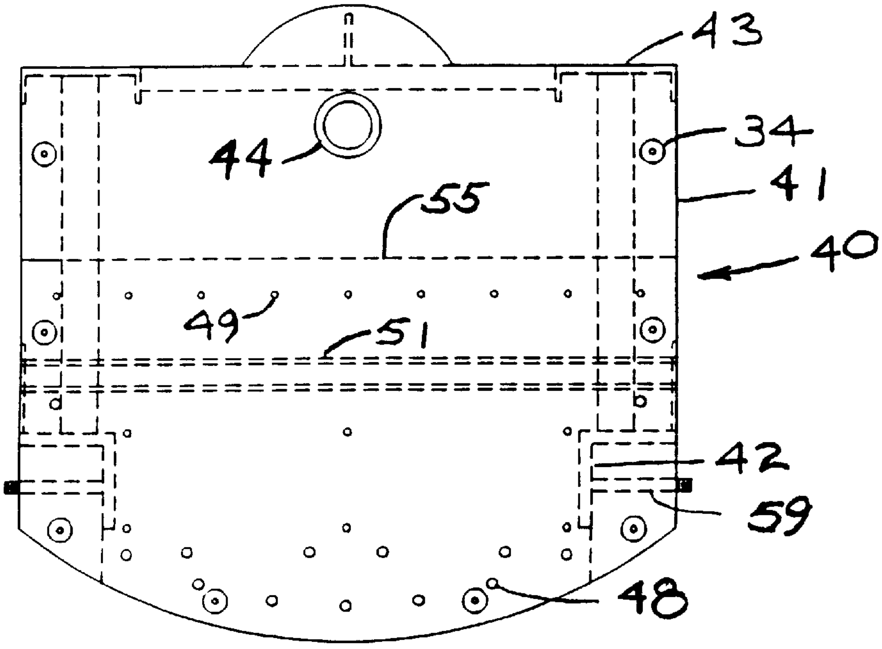
FIG. 20 is a side elevation of the lower box assembly.
Figure 21:
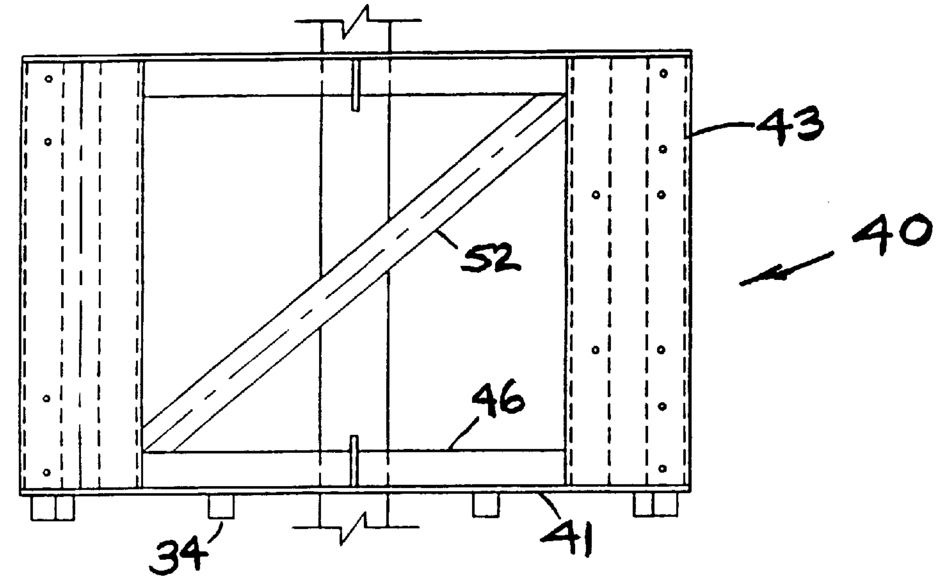
FIG. 21 is a plan view of the lower box assembly.

FIGS. 19, 20 and 21 are side elevations and a top plan of the lower box assembly 40 showing lower box side plates 41, lower box side rails 42, upper structural mounting channels 43, the lower shaft 44, steel reinforcing bars 48, 49 and 51, lower box side frame attachment plates 50 and reinforcements 45, 46 and 52. Lower box lifting lugs 54 are used during assembly. Threaded rods 59 extend from angles 42 to receive trim weights. Lugs 34 receive lower bull gear mounting bolts. The side plates, reinforcements and reinforcing bars are shipped preassembled in a container. The container becomes a form for pouring the lower concrete counterweight.

Figure 22:
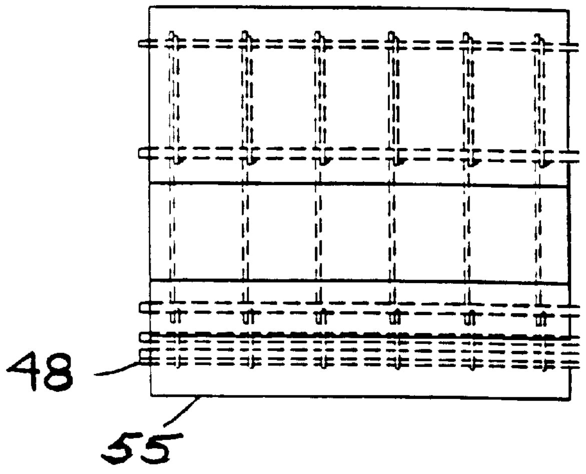
FIG. 22 is a front elevation of the lower box counterweight.
Figure 23:
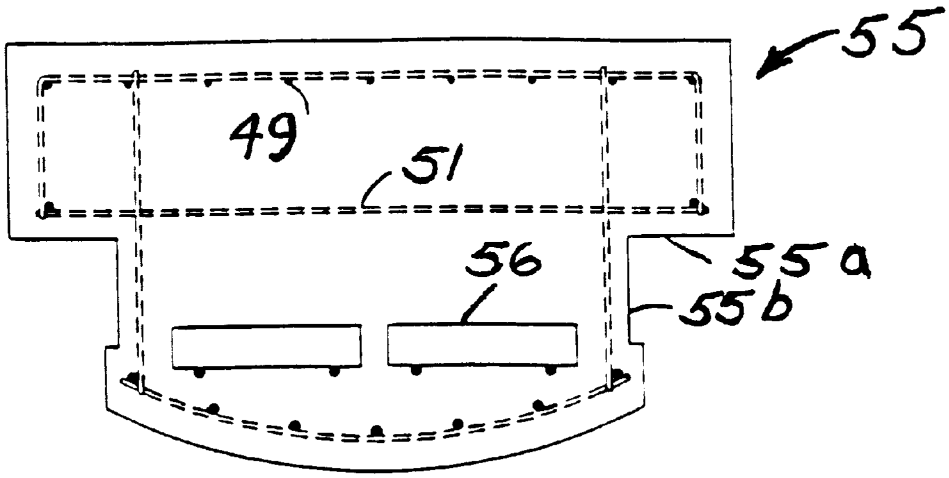
FIG. 23 is a side elevation of the lower box counterweight.
Figure 24:
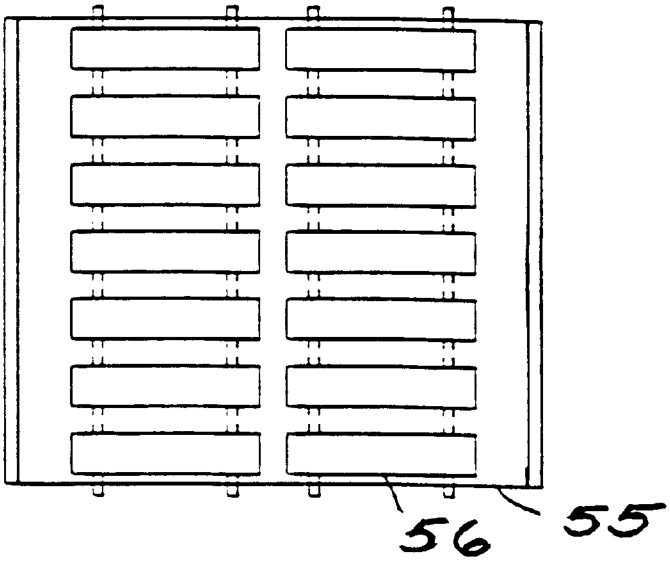
FIG. 24 is a plan view of the lower box counterweight.

FIGS. 22, 23 and 24 are front and side elevations and a plan view of the lower box counterweight 55. Lead weights 56 are shown in FIGS. 23 and 24, which are added optionally after the concrete is first poured up to a level corresponding with the bottoms of the lead weights, followed by adding the lead weights and pouring the remaining concrete. The shoulders 55*a* of the upper part of the counterweight rest on the angles 42, which fit within the lateral recesses 55*b* in the counterweight 55 and hold the counterweight assembled in the lower box 40, as shown in FIG. 20.

Figure 25:
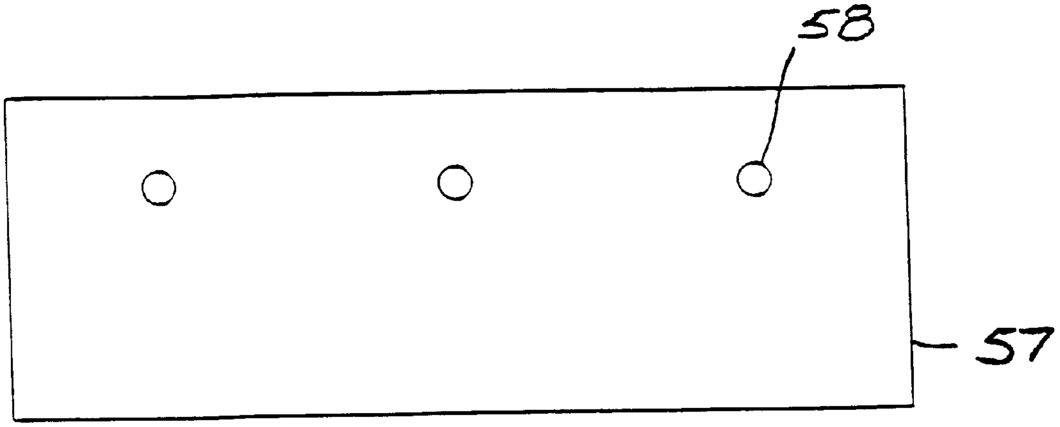
FIG. 25 is a side elevation of a lower box trim weight.

FIG. 25 shows a side elevation of a lower box trim weight 57 made from plates with holes 58 for connecting to the partially threaded rods 59 on the side rails 42 shown in FIGS. 19 and 20. Similar upper box trim weights are connected to partially threaded rods 32 on side rails 29 shown in FIGS. 9 and 10.

Figure 26:
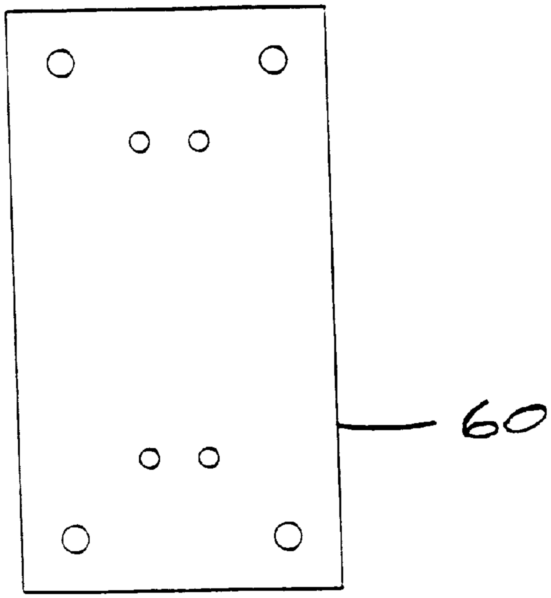
FIG. 26 is a front elevation of the lower shaft bearing mounting plate.

FIG. 26 shows the lower bearing plate 60, for attaching the pillow blocks, which support bearings for the lower shaft 44, to supports 12 or 13 of the steel or concrete foundation base.

Figure 27:
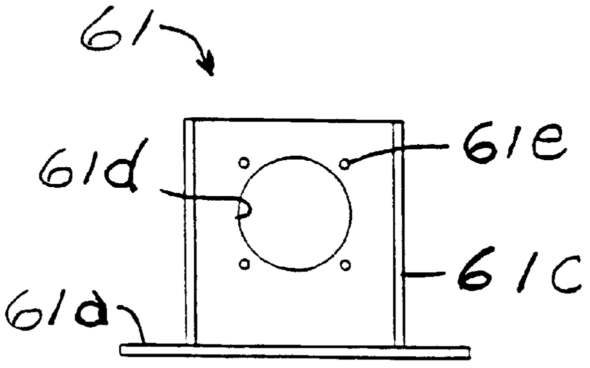
FIG. 27 is a front elevation of a motor support.
Figure 28:
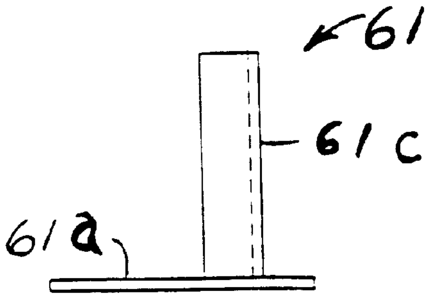
FIG. 28 is a side elevation of a motor support.
Figure 29:
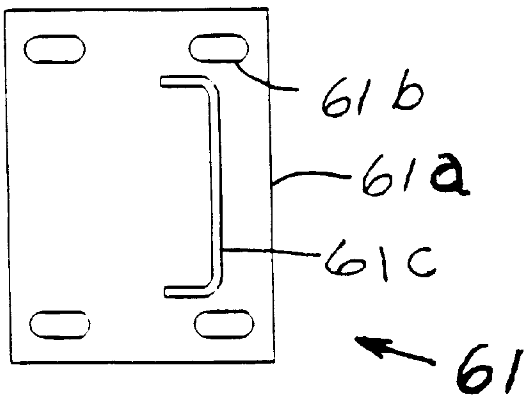
FIG. 29 is a plan view of a motor support.
Figure 30:
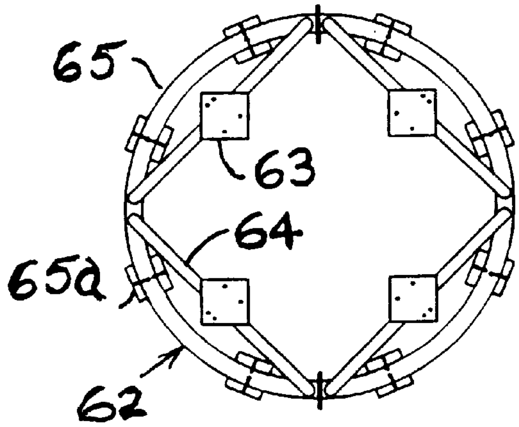
FIG. 30 is a bottom view of a top space frame.

FIGS. 27, 28 and 29 show one of the motor supports 61 in front and side elevations and plan view for mounting a motor and pinion to drive a bull gear. Base 61*a* has openings 61*b* to mount on bolts fixed in the base or on bolts fixed to one of the channels 43 shown in FIG. 20. Channel 61*c* has a large central opening 61*d* to allow passage of a pinion gear. Smaller openings 61*e* receive bolts for mounting a motor.

FIGS. 30–34 are respectively a bottom view, side elevations and a top view of a top space frame assembly 62. The square plates 63 shown in FIG. 30 mount on the inverted channels 23 on top of the upper box assembly 20 shown in FIG. 10. The legs 64, best shown in the side elevations connect the upper antenna mounting ring 65, best shown in FIG. 34, to plates 63. The plates 63 and legs 64 form V-shaped leg assemblies. Plates 65*a* are used for mounting the antenna 3 shown in FIGS. 1–4.

Figure 31:
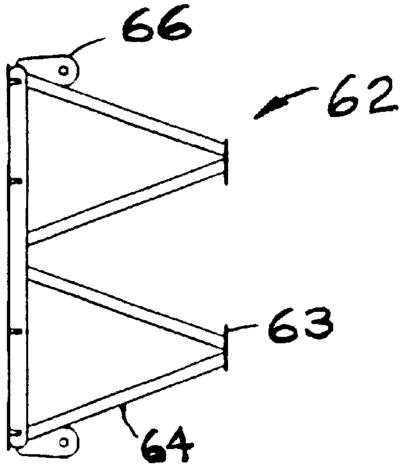
FIG. 31 is a front elevation of the top space frame shown in FIG. 30.
Figure 32:
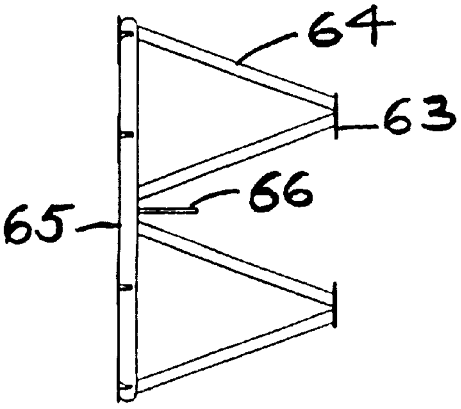
FIG. 32 is a side elevation view of the top space frame shown in FIGS. 30 and 31.
Figure 33:
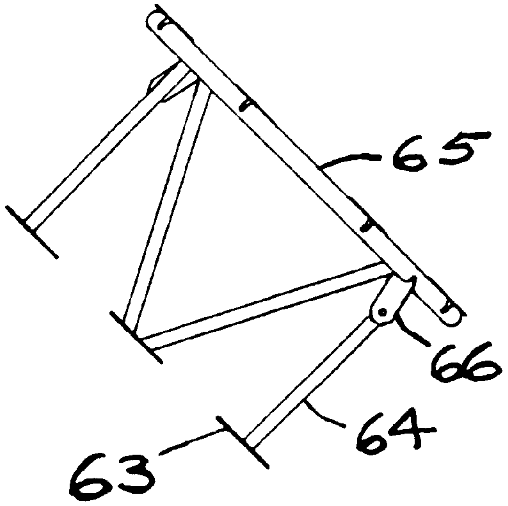
FIG. 33 is a rotated 45° elevation view of the top space frame shown in FIG. 31.
Figure 34:
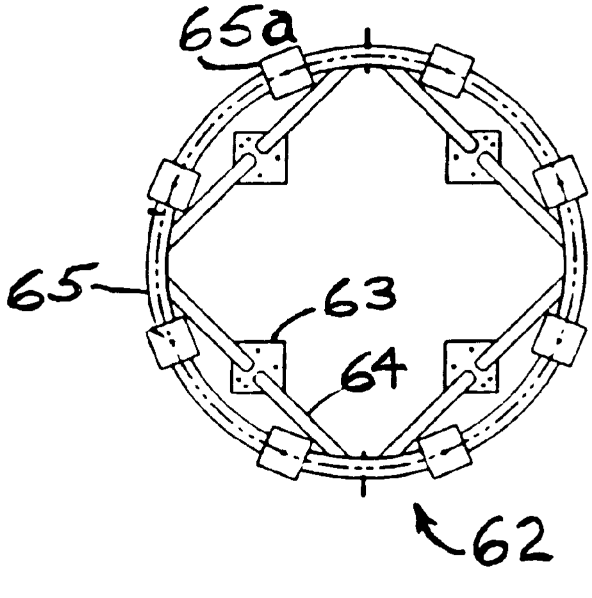
FIG. 34 is a top view of the top space frame shown in FIGS. 30–33.

The tie-down lugs 66, best shown in FIG. 31, are oriented perpendicular to the upper shaft and hold the upper box steady during erection, as well as providing additional support during high-wind conditions.

FIGS. 35–39 are respectively elevations, a top plan and a bottom view of a side frame assembly 67, two of which are required to mount on the lower box assembly for supporting bearings for ends of the upper shaft of the upper box assembly.

Figure 35:
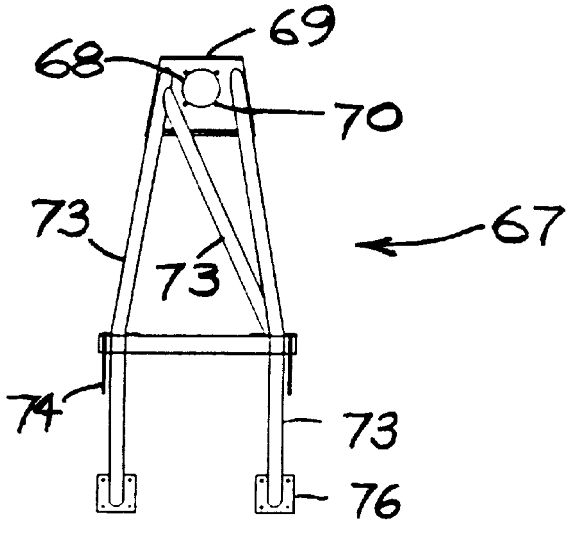
FIG. 35 is an outer, front elevation of a side space frame assembly.
Figure 37:
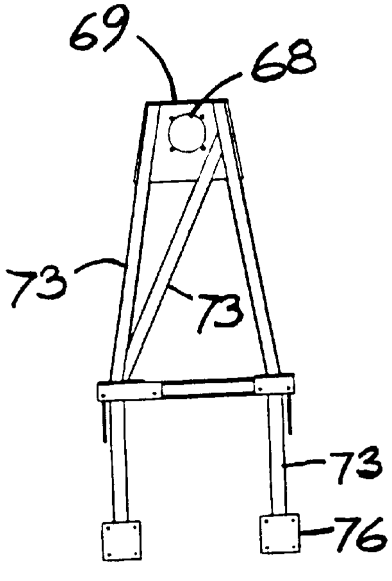
FIG. 37 is an inner side elevation of the side space frame assembly shown in FIGS. 35 and 36.
Figure 38:
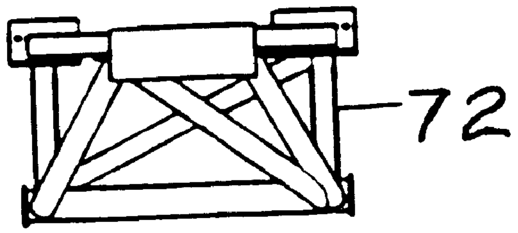
FIG. 38 is a top plan view of a side space frame assembly shown in FIGS. 35–37.
Figure 39:
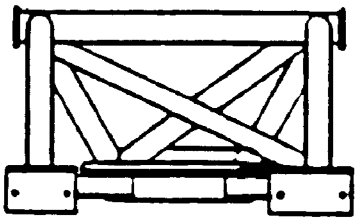
FIG. 39 is a bottom view of a side space frame assembly shown in FIGS. 35–38.

The openings 68 in the top bearing support plate 69, which are best shown in the outer side view, FIG. 35, and the inner side view, FIG. 37, receive bearings. Adjacent openings 70 receive bolts for mounting the upper shaft support bearings.

Figure 36:
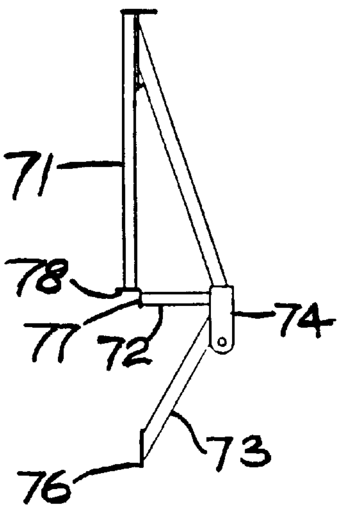
FIG. 36 is a side elevation of the side space frame assembly shown in FIG. 35.

The vertical tubes 71, horizontal tube members 72 and the sloping tube members 73 form a truss structure. The tie-down lugs 74, which are best shown in FIG. 36, are used to secure the lower box during installation, when performing maintenance and during high-wind conditions. The upper plates 78 and side plates 77 are part of channel members which engage and are bolted or welded to the inverted channels 43 on the lower box 46. Plates 76 connect to plates 50 on the lower box as shown in FIG. 19.

Figure 40A:
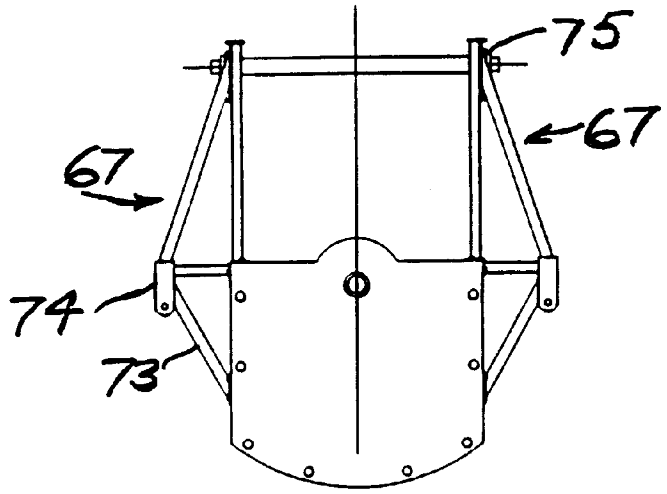
FIG. 40A is a side elevation of side space frame installation on the lower box.
Figure 40B:
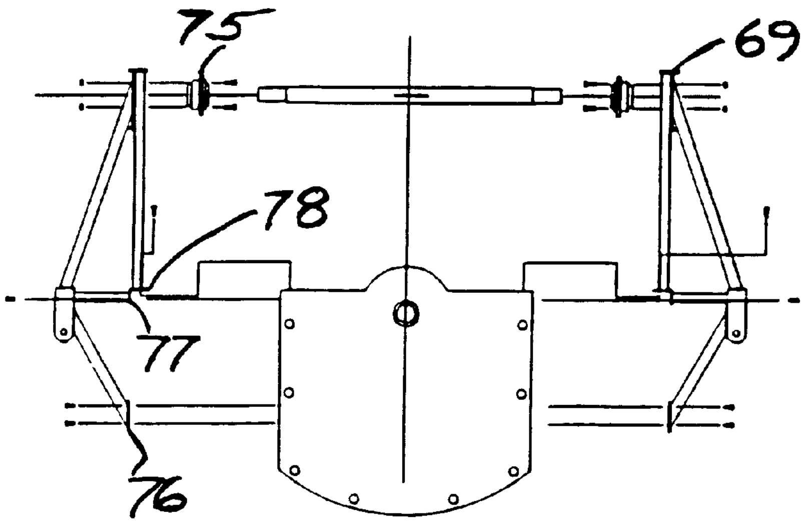
FIG. 40B shows an exploded view of a side elevation of side space frame installation on the lower box.
Figure 41:
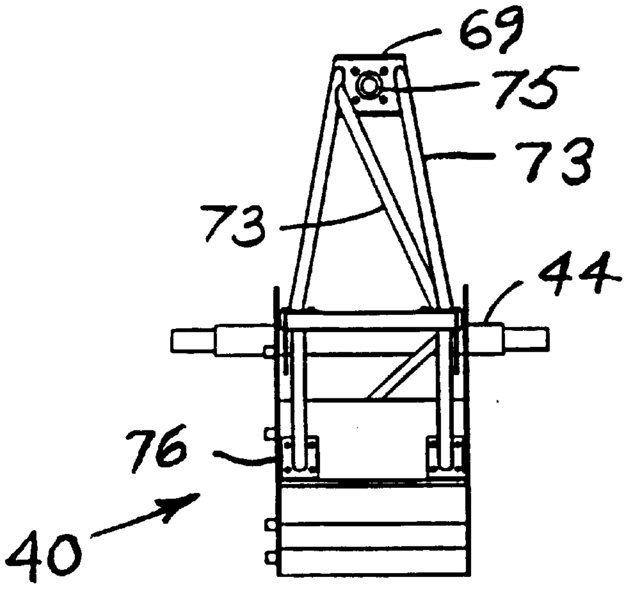
FIG. 41 is a front elevation of the side space frames installed on the lower box.
Figure 42:
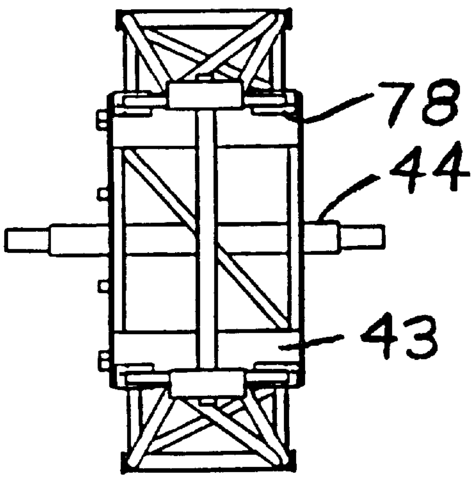
FIG. 42 is a plan view of the side space frames installed on the lower box.
Figure 43:
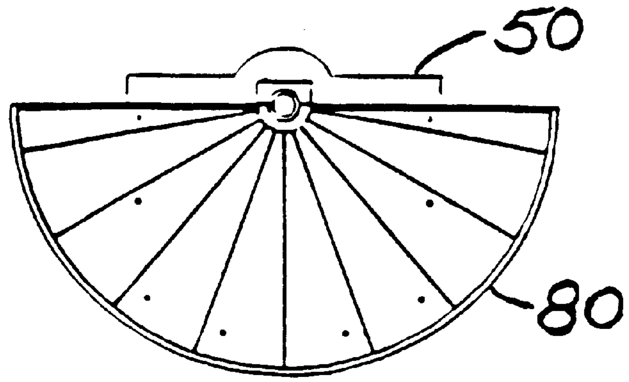
FIG. 43 is an outer side view of the lower bull gear on the lower box assembly.
Figure 44:
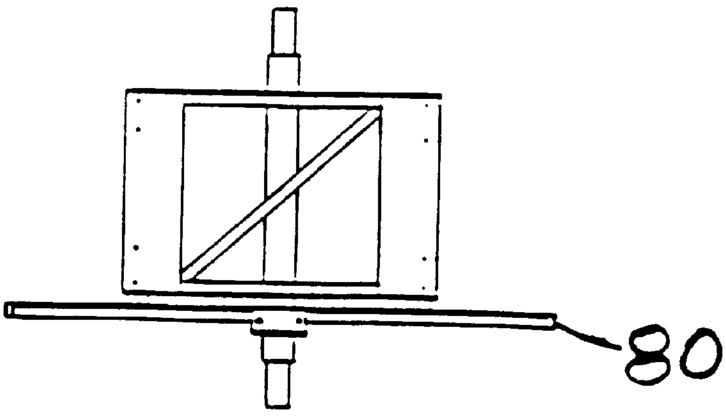
FIG. 44 is a top plan view of the lower bull gear on the lower box assembly.
Figure 45:
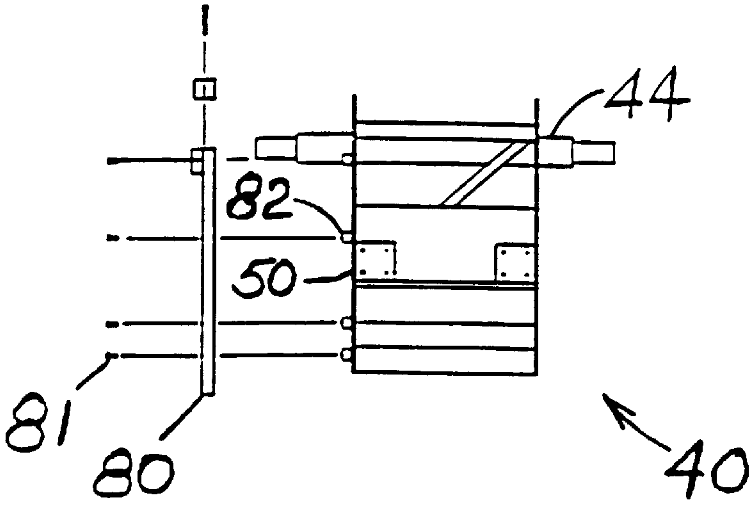
FIG. 45 is an elevation showing the installation of the lower bull gear on the lower box assembly.
Figure 46:
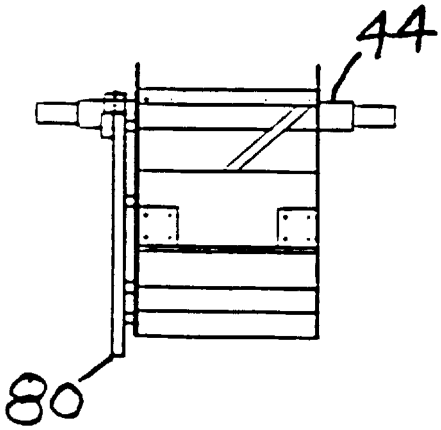
FIG. 46 is an elevation of the lower bull gear on the lower box assembly.
Figure 47:
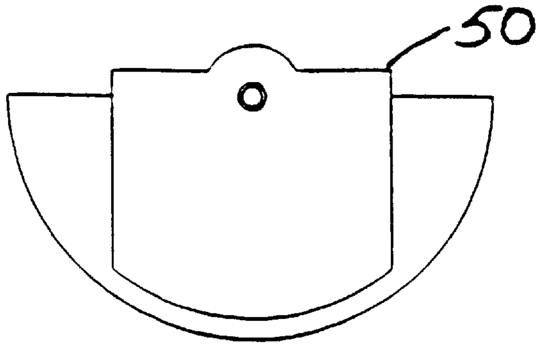
FIG. 47 is an elevation of the lower bull gear assembly on the lower box assembly.
Figure 48A:
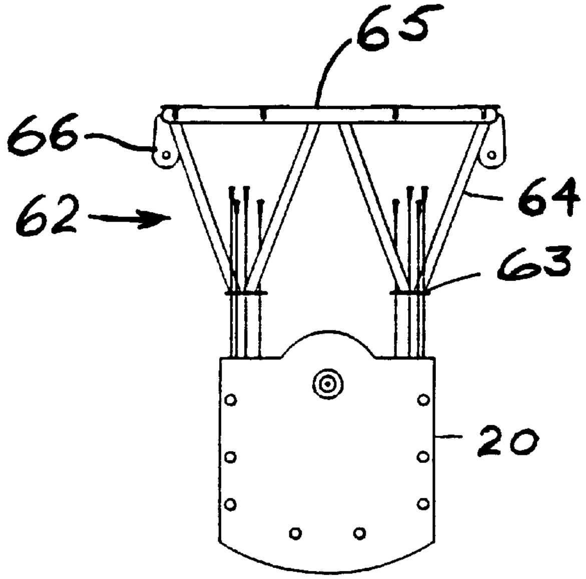
FIGS. 48A and 48B are front views showing the installation of the top space frame assembly to the upper box assembly.
Figure 48B:
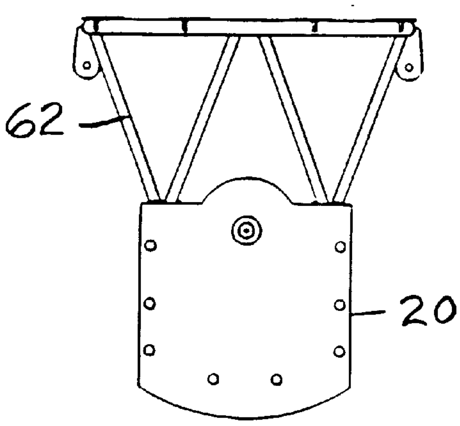
Figure 49:
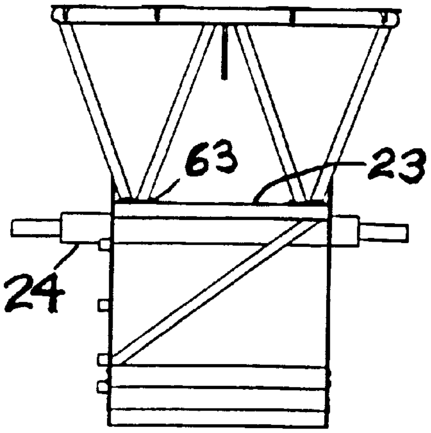
FIG. 49 is a side elevation view of the top space frame assembly on the upper box assembly.
Figure 50:
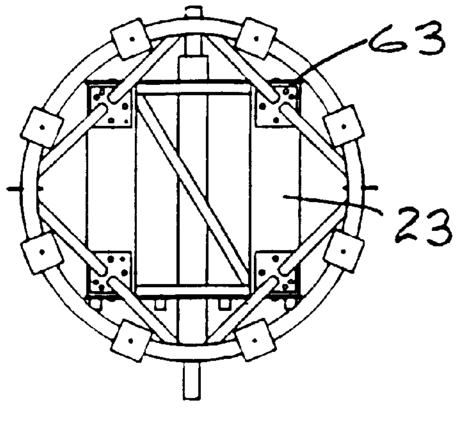
FIG. 50 is a top view of the top space frame assembly on the upper box assembly.
Figure 51:
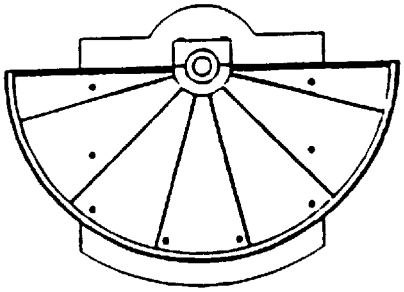
FIG. 51 is a back view of the upper bull gear on the upper box assembly.
Figure 52:
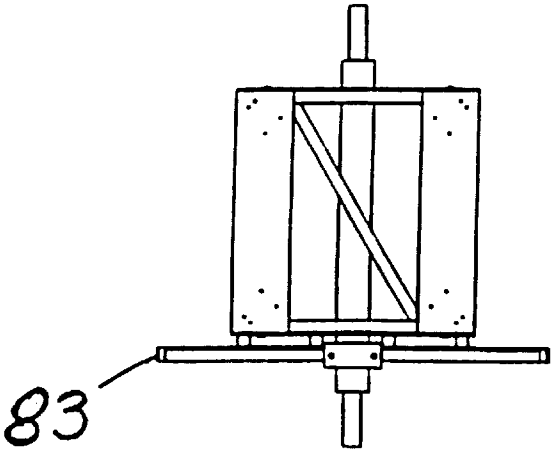
FIG. 52 a top view of the upper bull gear on the upper box assembly.
Figure 53:
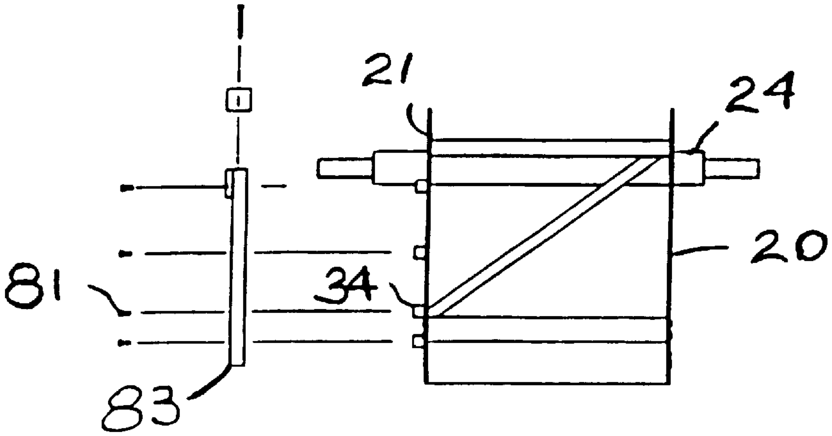
FIG. 53 is a side view of the installation of the upper bull gear on the upper box assembly.
Figure 54:
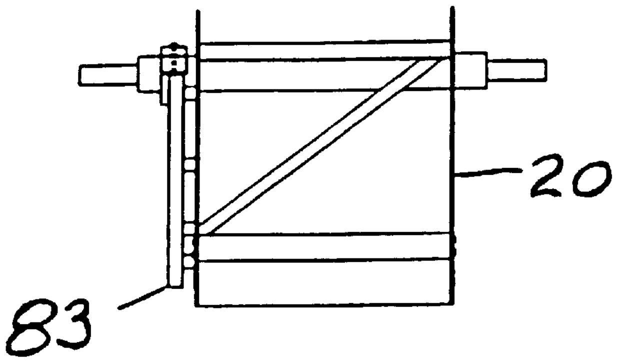
FIG. 54 is a side view of the upper bull gear on the upper box assembly.
Figure 55A:
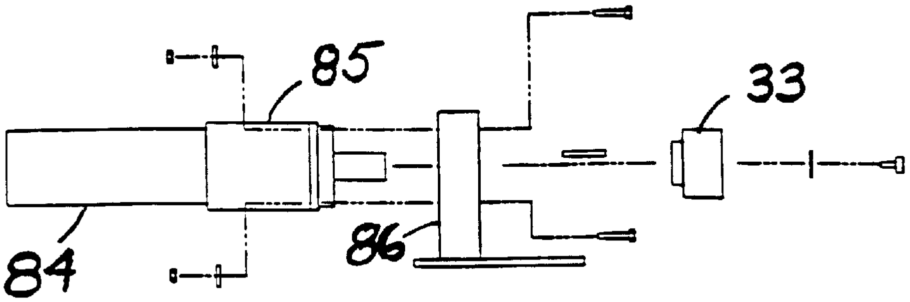
FIGS. 55A and 55B are an exploded view and a side elevation of the motor and pinion gear assembly.
Figure 55B:
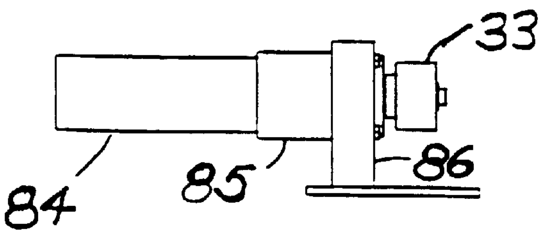
Figure 56:
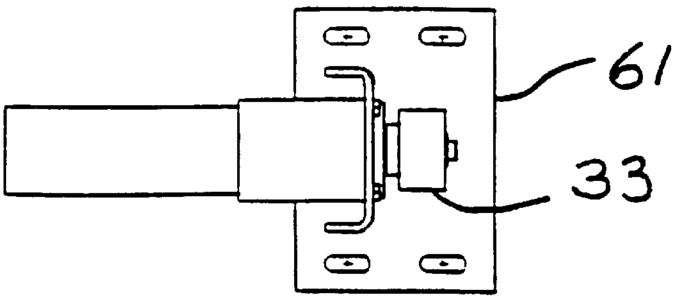
FIG. 56 is a plan view of the motor and gear box assembly.
Figure 57:
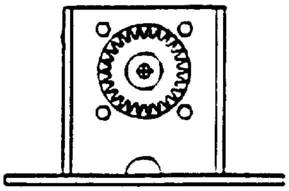
FIG. 57 is an end elevation view of the motor and gear box assembly.

FIGS. 40–42 show side space frame 67 installation. The upper bearings 75 are mounted inside the openings 68 in the upper plate 69 of the side frames for holding the upper shaft. Plates 76 mount on the lower box side frame plates 50, and plates 77 and 78 bear on the upper channels of the lower box 40.

FIGS. 43–47 show the lower bull gear 80 installation on the lower box assembly 40. Bolts 81 attach the bull gear 80 to lugs 82 on the lower box side plate 50.

FIGS. 48A–50 show the top space frame 62 installation on the upper box assembly 20. Bolts connect plates 63 to inverted channels 23 of the upper box.

FIGS. 51–54 show the upper bull gear 83 installation on the upper box assembly 20 with bolts 81 which screw into threaded lugs 34 on side plate 21.

FIGS. 55A–57 are an exploded view, a side elevation, a plan view and an end elevation of the motor 84 and gear box 85 assembly mounted on the motor mount channel 86. The pinion gear 33 is mounted on the output shaft of the gear box 85. An end of the gear box extends through the channel 86. Nuts and bolts connect a collar on the gear box to the flange.

Figure 58:
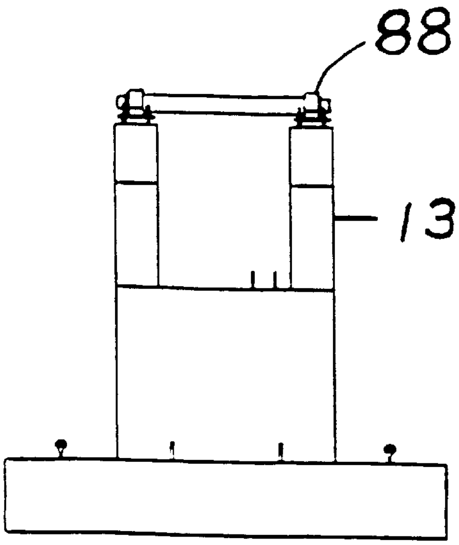
FIG. 58 is a front view of the lower bearing assembly on the pedestal base.
Figure 59:
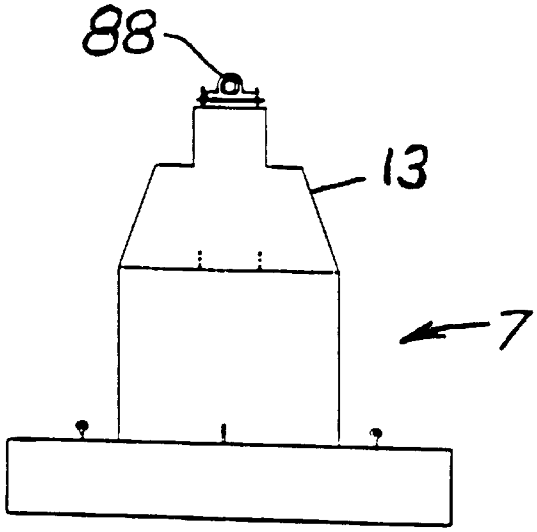
FIG. 59 is a side elevation of the lower bearing assembly on the pedestal base.
Figure 60:
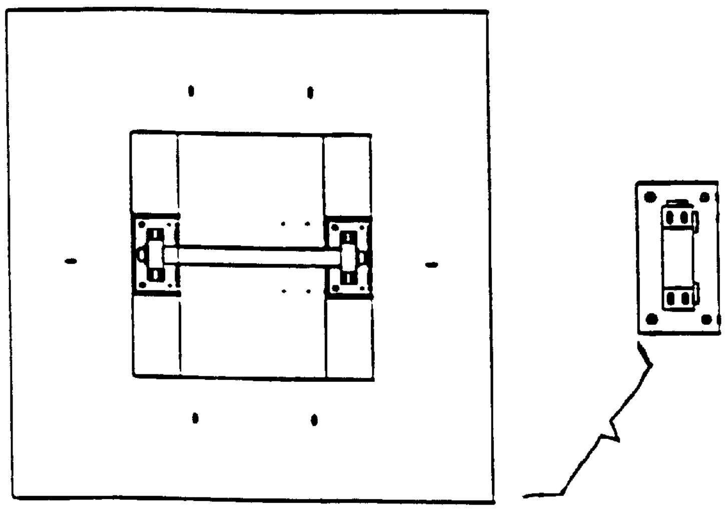
FIG. 60 is a plan view and detail of the lower bearing assembly on the pedestal base.
Figure 61:
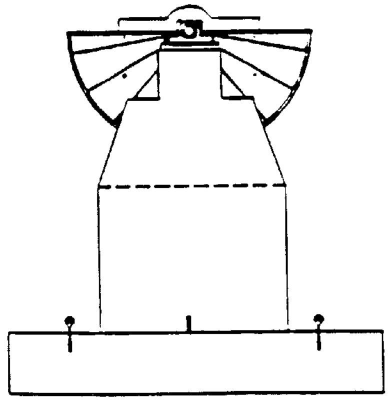
FIG. 61 is a side elevation of the lower box final assembly in the lower bearings on the pedestal base.
Figure 62:
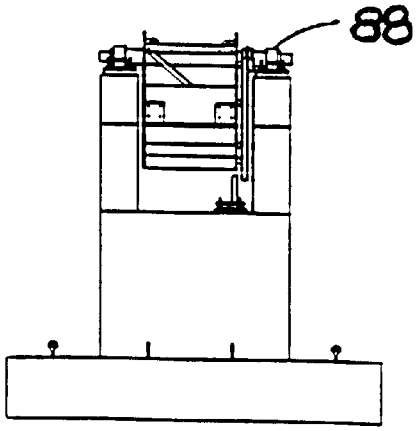
FIG. 62 is an elevation of the lower box final assembly in the lower bearings on the pedestal base.
Figure 63:
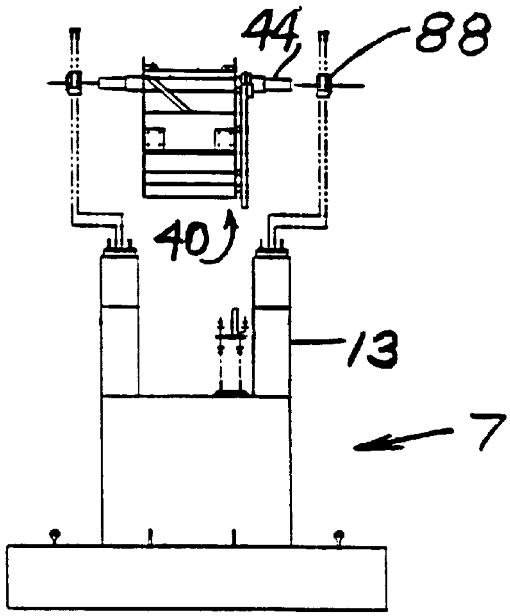
FIG. 63 is an exploded side view of the lower box and lower shaft final assembly in the lower bearings on the pedestal base.
Figure 64:
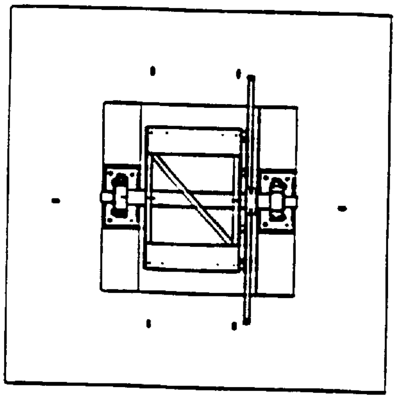
FIG. 64 is a plan view of the lower box final assembly in the lower bearings on the pedestal base.
Figure 65:
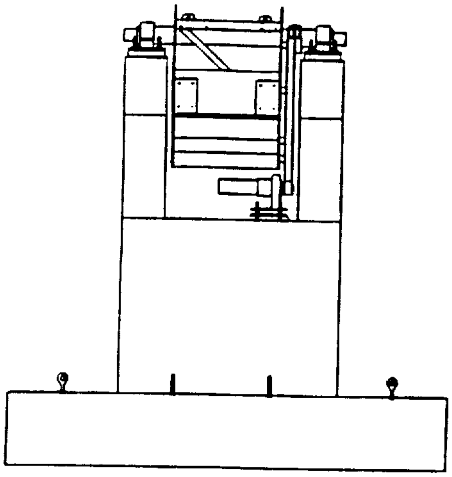
FIG. 65 is a front elevation of the lower box final assembly and the lower motor on the pedestal base.
Figure 66:
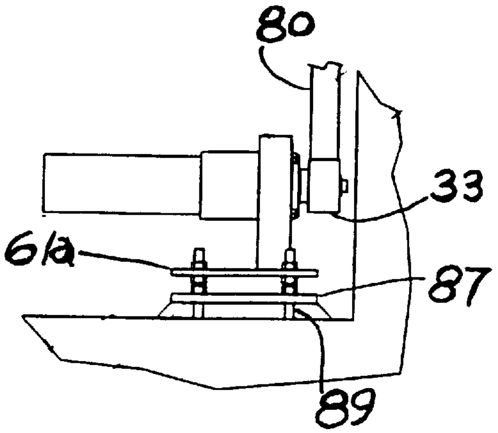
FIG. 66 is a front elevation detail of the lower motor installation upon the pedestal base.
Figure 67:
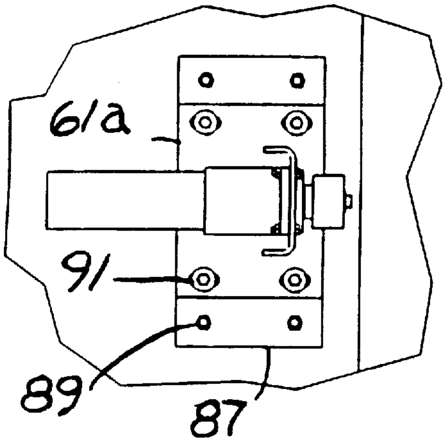
FIG. 67 is a plan view of the lower motor installation upon the pedestal base.
Figure 68:
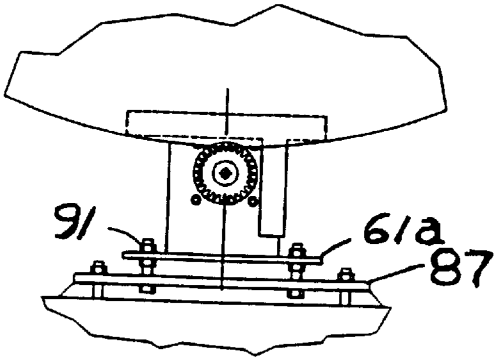
FIG. 68 is a side elevation view of the lower motor installation upon the pedestal base showing use of a gear alignment tool.
Figure 69:
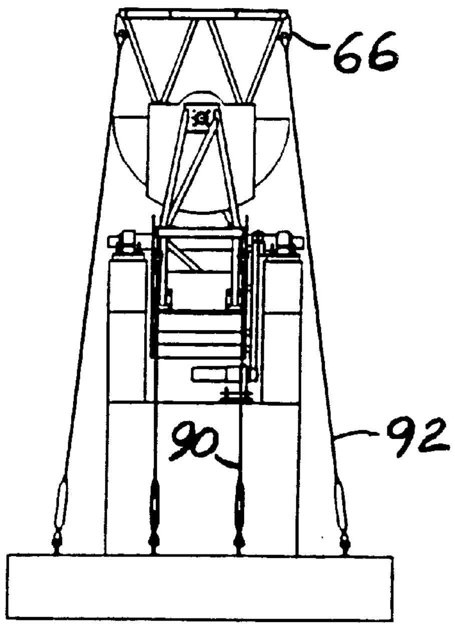
FIG. 69 is a front elevation view of the upper and lower box assemblies with the upper and lower tie-down cables in place.
Figure 70:
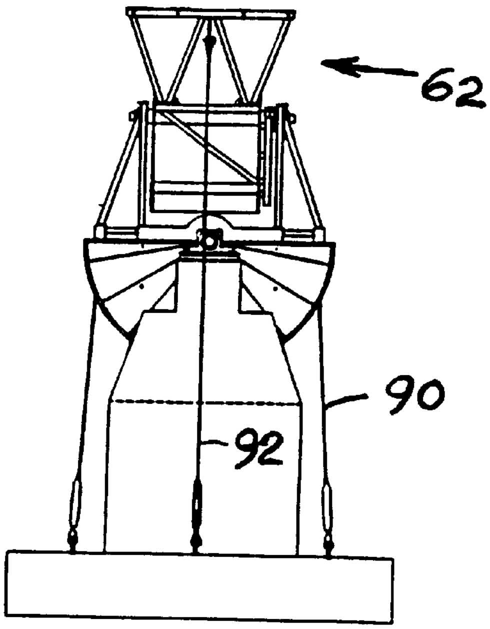
FIG. 70 is a side elevation view of the upper and lower box assemblies with the upper and lower tie-down cables in place.
Figure 71:
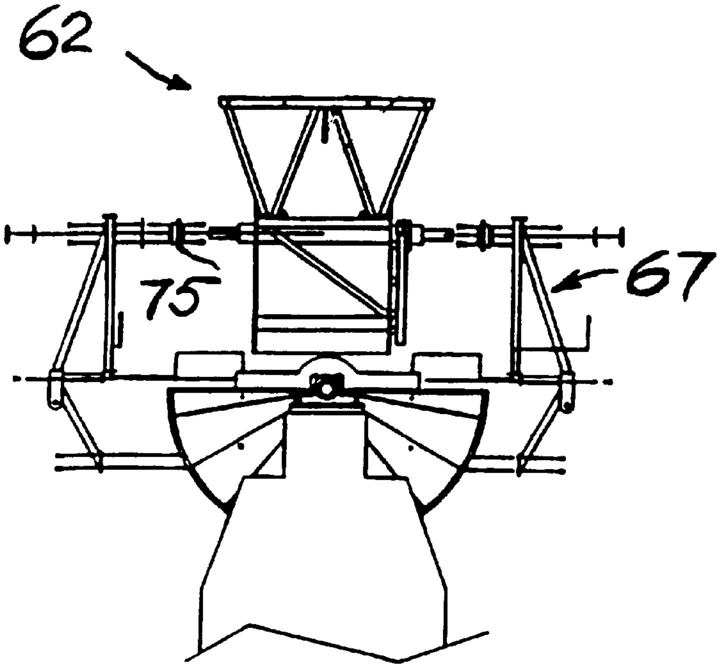
FIG. 71 is an exploded view of the upper box assembly showing the upper and lower tie-down tabs.
Figure 72:
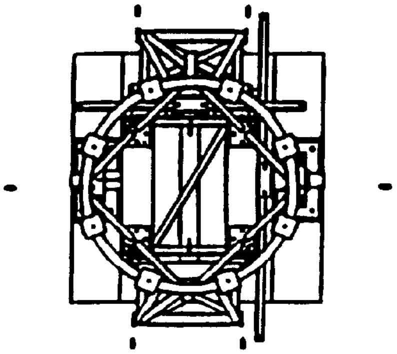
FIG. 72 is a plan view of the final upper box assembly.
Figure 73:
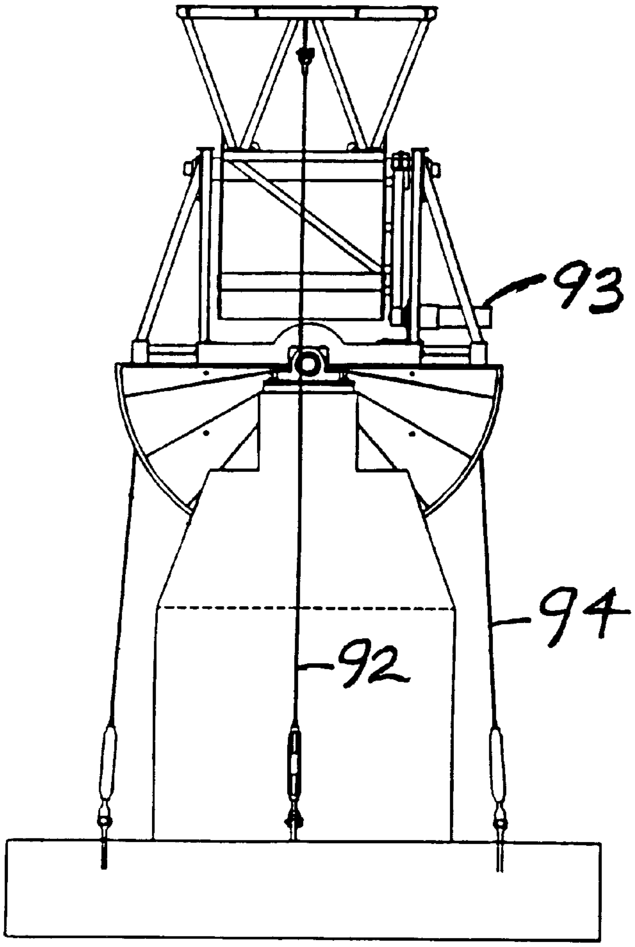
FIG. 73 is a side elevation of the upper and lower assemblies with the upper and lower tie-down cables in place during upper motor installation.
Figure 74:
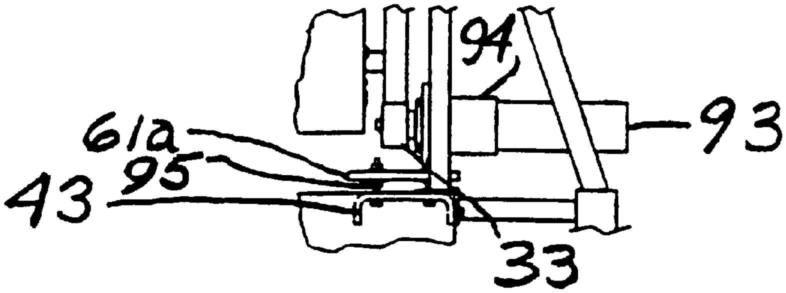
FIG. 74 is a side elevation view of the upper motor assembly installation on the lower box.
Figure 75:
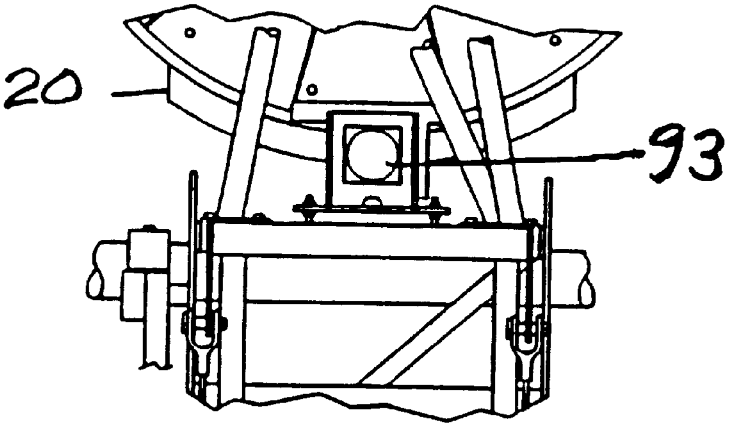
FIG. 75 is a front elevation view of the upper motor installation on the lower box.
Figure 76:
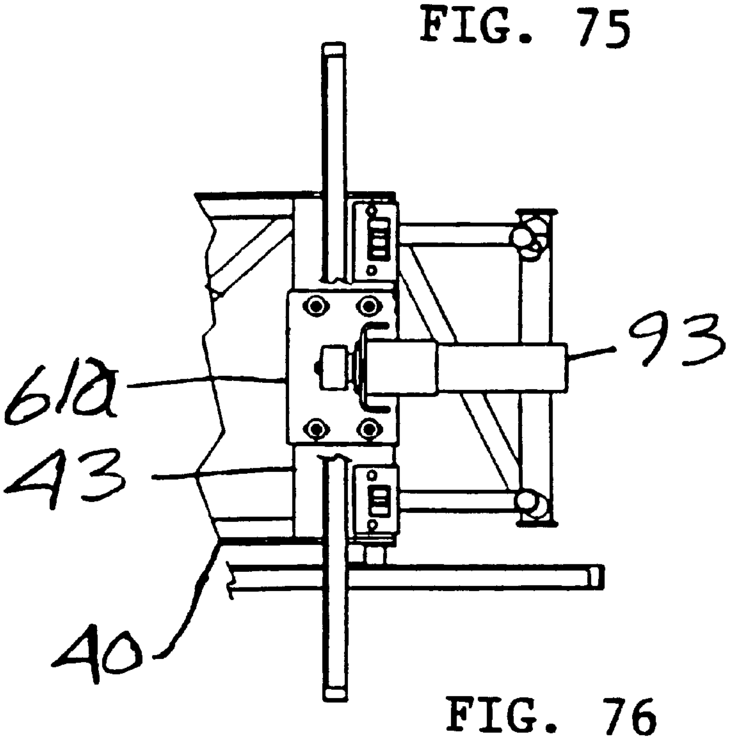
FIG. 76 is a plan view of the upper motor on the lower box assembly.

FIGS. 58–60 show the lower bearings 88 assembled on the upward extending supports 13 of the pedestal base 7. The bearings are mounted in pillow blocks attached to plates on upper surfaces of the pedestal base 7. A similar connection is provided to the tubular base depicted in FIG. 1B.

FIGS. 61–64 show the lower box 40 final assembly in the lower bearings 88 on the base. Lower shaft 44 is inserted in the bearings 88 which are then placed in position on the supports 13.

FIGS. 65–68 show the lower motor installation on the base. A base plate 87 is secured to bolts 89 imbedded in the top of the block. Base 61*a* of motor mount 61 is adjusted on the bolts 91 secured to the base plate 87 so that the drive pinion 33 is engaged and aligned with lower bull gear 80.

FIGS. 69–72 show the upper and lower tie down cables in place. Four lower tie-down cables 90 are attached to the lower box 40. Then bearings 75 are inserted in side frames 67. The upper shaft 24 is inserted in the bearings 75 and the side frames 67 are connected to the upper box 20. The upper box 20 and side frames 67 are then attached to the lower box 40. Then the upper tie-down cables 92 are connected to the base 7 and to the lugs on the space frame 62.

FIGS. 73–76 show the upper motor 93, gear box 94 and pinion 33 installation. Bolts 95 connect base 61*a* of the motor mount to the inverted channel member 43 at the top of the lower box 40.

Figure 77:
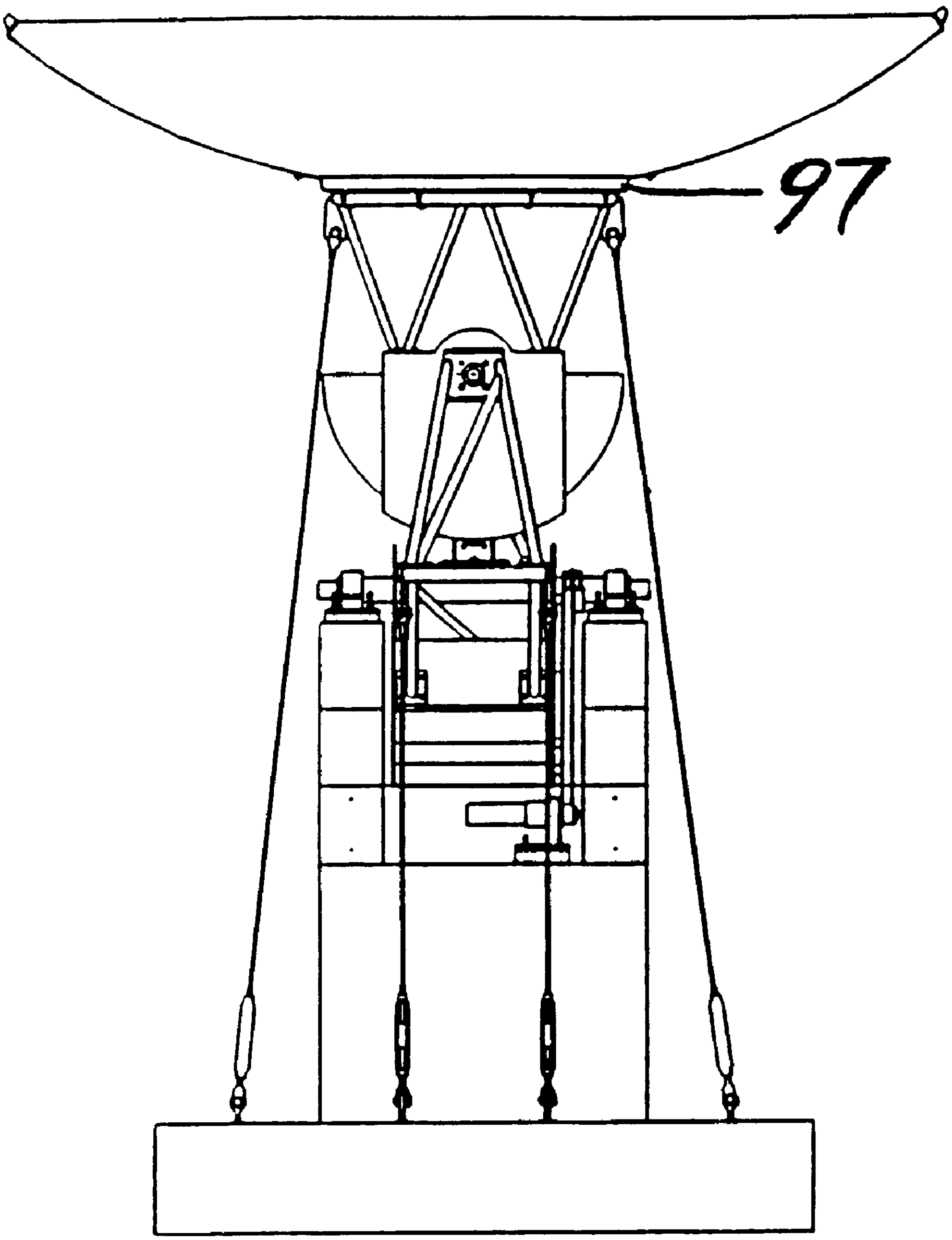
FIG. 77 is a front elevation of the antenna installation with the tie-down cables in place.
Figure 78:
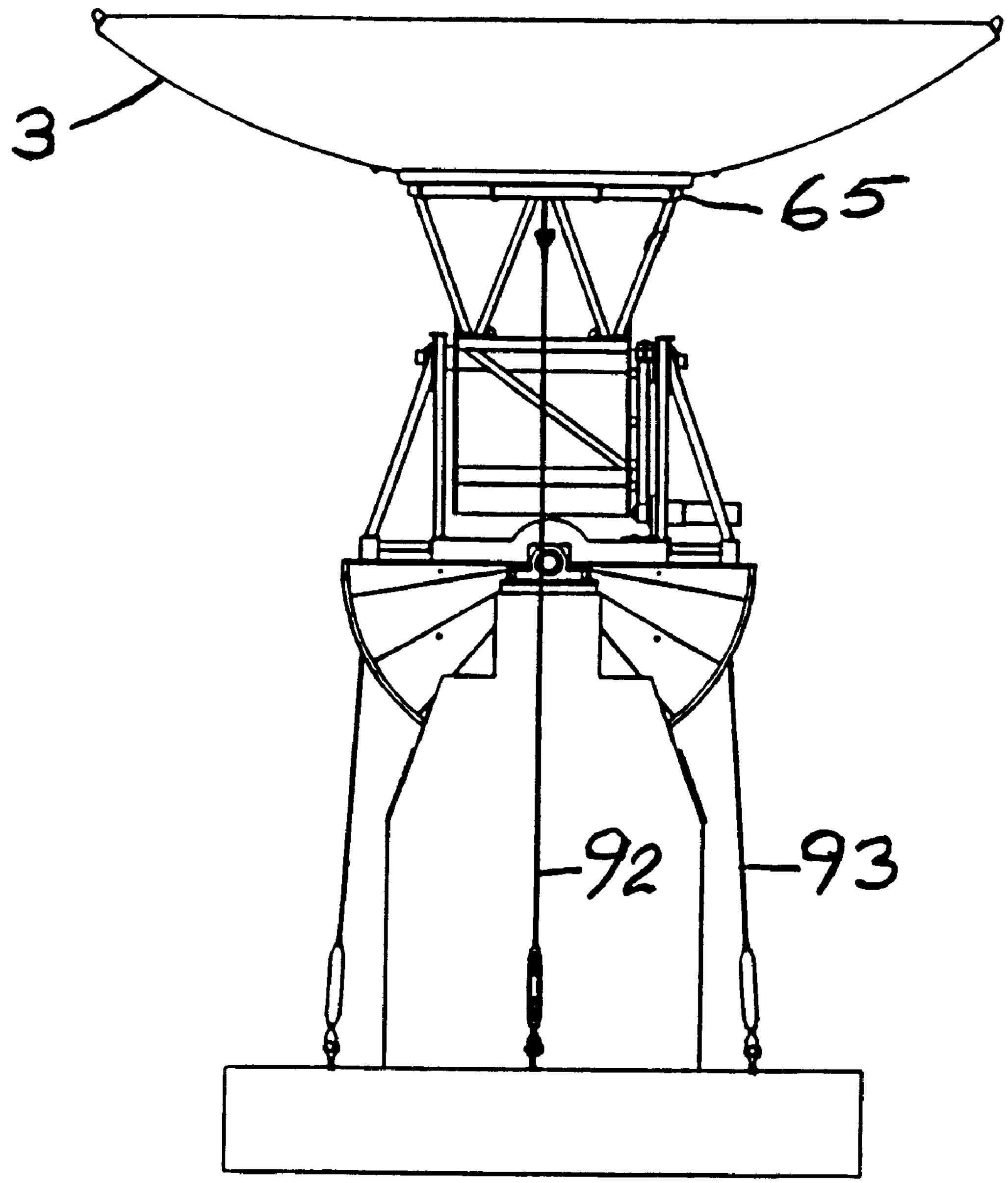
FIG. 78 is a side elevation view of the antenna installation with the tie-down cables in place.

FIGS. 77 and 78 show the antenna 3 installation with the upper and lower tie-down cables in place when the antenna base 97 is connected to the mounting ring 65.

While the invention has been described with reference to specific embodiments, modifications and variations of the invention may be constructed without departing from the scope of the invention, which is defined in the following claims.

I claim:

1. Dual-rotational axis antenna tracking pedestal apparatus comprising:

a foundation having a reinforced concrete construction;

a block having a reinforced concrete construction connected to the foundation;

lower shaft support arms having a reinforced concrete construction extending upward from the block;

pillow block bearings mounted on the support arms;

a lower shaft mounted in the pillow block bearings;

a lower shaft drive gear connected to the lower shaft;

a lower drive motor connected to the lower drive gear for rotating the lower drive gear and the lower shaft;

a lower box connected to the lower shaft for rotating with the lower shaft;

a lower counterweight connected to the lower box;

upper side frames connected to the lower box;

upper shaft supports connected to the side frames;

an upper shaft connected to the upper shaft supports;

an upper gear connected to the upper shaft;

an upper drive motor connected to the upper gear for turning the upper gear and the upper shaft;

an upper box connected to the upper shaft;

an upper counterweight connected to the upper box;

a top space frame;

legs connected to the upper box and to the top space frame for supporting the top space frame on the upper box; and antenna mounts mounted on the top space frame.

2. The apparatus of claim 1, further comprising a lower motor mount connected to the block and connected to the lower drive motor.

3. The apparatus of claim 2, further comprising a lower pinion gear on the lower drive motor and wherein the lower gear comprises a lower bull gear with teeth interengaging the lower pinion gear.

4. The apparatus of claim 3, wherein the lower gear is attached laterally to the lower box for moving the lower box upon turning the lower gear.

5. The apparatus of claim 4, wherein the lower box comprises lower side plates and wherein the lower counterweight comprises a reinforced concrete counterweight connected to the lower side plates and side angles.

6. The apparatus of claim 1, wherein the reinforced foundation base, reinforced block and lower shaft support arms comprise an integral reinforced base.

7. The apparatus of claim 1, further comprising counterweight containers and preassembled reinforcement bars for counterweights shipped with parts and subassemblies to erection sites in the containers containing the counterweight reinforcement bars wherein the containers are forms for pouring concrete and manufacturing counterweights at the site.

8. The apparatus of claim 1, wherein the lower box counterweight and the upper box counterweight are reinforced concrete counterweights with reinforcement bars preassembled and shipped in containers which act as forms for pouring the concrete counterweights on site.

9. The apparatus of claim 1, wherein the top space frame upper member is circular.

10. The apparatus of claim 9, wherein the upper gear is laterally joined to the upper box, wherein the upper shaft, the upper box and the upper gear are joined together and wherein the top space frame comprises angular leg trusses, with the legs joined in angled pairs having lower ends joined together and mounted on the upper box and the pairs having upper ends spaced apart and joined to the top space frame.

11. Dual-axle antenna tracking pedestal kit apparatus comprising:

precut foundation reinforcement bars packaged in a first shipping container construction form;

preassembled lower and upper boxes including side plates and preassembled cross members and counterweight reinforcement bars connected to the side plates and packaged in second and third shipping container construction forms ready for pouring concrete on site for forming lower and upper counterweights connected to the lower and upper boxes;

lower and upper bull gears for attachment to lower and upper side plates, respectively;

lower and upper drive motors with drive pinions for connection to the bull gears;

lower shaft pillow block bearings for mounting on a reinforced concrete support arms;

a lower shaft for mounting in the pillow block bearings and attaching the lower box and lower bull gear;

first and second side frame trusses for connecting to the lower box;

first and second upper shaft bearings connected to the side frame supports;

an upper shaft for mounting in the upper shaft bearings and connecting to the upper box and upper bull gear; and a top space frame having triangular leg assemblies for connecting to the upper box antenna mounts connected to the top space frame.

12. The kit apparatus of claim 11 further comprising lead weights for positioning on the lower counterweight reinforcement bars before pouring in concrete.

13. The kit apparatus of claim 11 further comprising auxiliary trim weights for attaching to the counterweights.

14. The kit apparatus of claim 11 wherein the first and second side frame supports further comprise first and second spaced bearing plates for mounting the upper shaft bearings, first and second pairs of lower plates for mounting on opposite sides of the lower box, first and second intermediate angular plate pairs for connecting to a top of the lower box at spaced locations and first and second three dimensional tubular trusses connected respectively to the first and second bearing plates, to the first and second pairs of lower plates and to the first and second intermediate angular plate pairs for supporting the bearing plates from the sides and top of the lower box.

15. The kit apparatus of claim 14, wherein the side frame trusses are tubular trusses and wherein the extensions, braces and tube trusses comprise tubes welded at ends thereof.

16. The kit apparatus of claim 11 wherein the top space frame further comprises a circular tube upper member with antenna mounts and wherein the leg assemblies further comprise v-shaped tubular legs with lower juxtaposed ends and with spaced upper ends welded to the circular tube member and leg mounting plates welded to the lower ends for mounting the lower ends of the v-shaped legs on the upper box.

17. Tracking pedestal apparatus for a dual-rotational axis antenna comprising:

a foundation having a reinforced concrete construction;

a block having reinforced concrete construction connected to the foundation;

lower shaft reinforced concrete support arms extending upward from the block;

pillow block bearings mounted on the support arms;

a lower shaft mounted in the pillow block bearings;

a lower bull gear connected to the lower shaft;

a lower shaft drive gear connected to the lower bull gear;

a lower drive motor mounted on the block and connected to the lower drive gear for rotating the lower drive gear, the lower bull gear and the lower shaft;

a lower box connected to the lower bull gear for rotating with the lower bull gear;

a lower counterweight connected to the lower box;

upper side frames connected to the lower box;

upper shaft supports connected to the lower box;

an upper shaft connected to the upper shaft supports;

an upper bull gear connected to the upper shaft;

an upper drive gear connected to the upper bull gear;

an upper drive motor mounted on the lower box and connected to the upper drive gear for turning the upper bull gear and the upper shaft;

an upper box connected to the upper bull gear;

an upper counterweight connected to the upper box;

a top space frame;

legs connected to the upper box and to the top space frame for supporting the top space frame on the upper box; and antenna mounts mounted on the top space frame.

18. Dual axle tracking pedestal apparatus comprising a stiffened pedestal base having support arms, a lower shaft mounted on the support arms, a stiffened lower box on the lower shaft, a lower counterweight at a bottom of the lower box, a lower drive connected between the pedestal base and the lower box, stiffened side supports connected to the lower box and extending upward, an upper shaft mounted in the side supports, a stiffened upper box mounted in the upper shaft and an upper counterweight mounted in a bottom of the upper box, an upper drive connected between the lower box and upper box, a stiffened top support mounted on the upper box, the stiffened top support further comprising an antenna mount, the stiffened pedestal, the stiffened lower box, the stiffened side supports, the stiffened upper box and the stiffened upper support providing increased natural frequencies of vibration for rendering pedestal slew less sensitive to wind.

19. The apparatus of claim 18, wherein the side supports and top support comprise side space frames and a top space frame, respectively.

20. The apparatus of claim 18, wherein the stiffened side supports further comprise tubular side trusses, wherein the stiffened top support further comprises tubular leg trusses connected to the antenna mount, and wherein the antenna mount further comprises a circular tube.

21. The apparatus of claim 18, wherein the boxes and the counterweights comprise preassembled plates and cross members and reinforcement rods and concrete poured around the reinforcement rods in situ.

22. The apparatus of claim 18, wherein the lower shaft and upper shaft are-aligned in perpendicular planes and wherein the boxes rotate on the shafts for tracking without producing a keyhole effect after slewing.

23. The apparatus of claim 18 wherein the counterweights further comprise masses for providing vertical restoring of the boxes on the shafts for righting an antenna on the antenna mount in vertical orientation in wind for providing safety in assembly, operation and maintenance.

24. The apparatus of claim 18 further comprising upper lugs connected to the antenna mount, lower lugs connected to the side supports, upper tie-down cables for connecting between the upper lugs and the pedestal base and lower tie-down cables for connecting between the lower lugs and the pedestal base in high winds.

25. The apparatus of claim 18 wherein the pedestal base comprises reinforced concrete.

26. The apparatus of claim 18 wherein the pedestal base comprises steel plates joined together in a heavy stiffened, rigid structure.

27. The apparatus of claim 26 wherein the steel plates are joined together in a cylinder and wherein the support arms are steel plates joined in upper extension of opposite sides of the steel cylinder.

28. The apparatus of claim 26 wherein the steel plates are joined together in double spaced inner and outer steel cylinders and wherein the support arms are steel plates joined in upper extension of opposite sides of the steel cylinders.

29. The apparatus of claim 18 wherein the pedestal base comprises a cylinder of joined steel plates and a steel base plate joined to the cylinder with triangular stiffening plates.

* * * * *